(12) United States Patent
Hatton

(10) Patent No.: US 8,396,449 B2
(45) Date of Patent: Mar. 12, 2013

(54) METHOD AND SYSTEM FOR EMERGENCY CALL PLACEMENT

(75) Inventor: David Anthony Hatton, Berkley, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/493,030

(22) Filed: Jun. 11, 2012

(65) Prior Publication Data

US 2012/0252400 A1  Oct. 4, 2012

Related U.S. Application Data

(62) Division of application No. 13/036,979, filed on Feb. 28, 2011.

(51) Int. Cl.
*H04L 12/28* (2006.01)

(52) U.S. Cl. ............... 455/404.1; 455/404.2; 455/414.1

(58) Field of Classification Search ............ 455/404.2, 455/404.1, 414.1
See application file for complete search history.

(56) References Cited

U.S. PATENT DOCUMENTS

| | | | |
|---|---|---|---|
| 5,388,147 A | 2/1995 | Grimes | |
| 5,555,286 A | 9/1996 | Tendler | |
| 5,825,098 A | 10/1998 | Darby | |
| 5,918,180 A | 6/1999 | Dimino | |
| 6,073,004 A | 6/2000 | Balachandran | |
| 6,532,372 B1 | 3/2003 | Hwang | |
| 6,608,887 B1 * | 8/2003 | Reksten et al. | 379/67.1 |
| 6,680,998 B1 | 1/2004 | Bell et al. | |
| 6,757,528 B1 | 6/2004 | Cardina et al. | |
| 7,027,842 B2 | 4/2006 | Zhang et al. | |
| 7,113,091 B2 | 9/2006 | Script et al. | |
| 7,119,669 B2 | 10/2006 | Lundsgaard et al. | |
| 7,548,158 B2 | 6/2009 | Titus et al. | |
| 7,574,195 B2 | 8/2009 | Krasner et al. | |
| 7,580,697 B2 | 8/2009 | Lappe et al. | |
| 7,580,782 B2 | 8/2009 | Breed et al. | |
| 7,626,490 B2 | 12/2009 | Kashima | |

(Continued)

FOREIGN PATENT DOCUMENTS

| | | |
|---|---|---|
| EP | 1507129 A1 | 2/2005 |
| EP | 2093982 A1 | 12/2007 |

(Continued)

OTHER PUBLICATIONS

Ford Motor Company, "SYNC with Navigation System," Owner's Guide Supplement, SYNC System Version 1 (Jul. 2007).

(Continued)

*Primary Examiner* — Justin Lee
(74) *Attorney, Agent, or Firm* — Jennifer M. Stec; Brooks Kushman P.C.

(57) ABSTRACT

An emergency response system includes a restraint control module (RCM), a global positioning system module (GPSM), at least one output, at least one input, an SPDJB, and a vehicle associated computing system (VACS) in communication with the RCM, the GPSM, the at least one output, the at least one input and the SPDJB. Upon detection of an emergency event, the RCM requests that the VACS place an emergency call. Upon receiving a request from the RCM, the VACS queries the GPSM to obtain vehicle coordinates, informs the occupant of the onset of the call, and instructs a wireless device in communication with the VACS to place an emergency call. The VACS is operable to determine when an emergency call is connected. Once the emergency call is connected, the VACS relays a message indicating connection to the RCM, and contacts the SPDJB to contacts the Smart Power Distribution Junction Box (SPDJB).

16 Claims, 17 Drawing Sheets

U.S. PATENT DOCUMENTS

| | | |
|---|---|---|
| 7,706,796 B2 | 4/2010 | Rimoni et al. |
| 7,825,901 B2 | 11/2010 | Potera |
| 7,894,592 B2 | 2/2011 | Book et al. |
| 7,957,772 B2 | 6/2011 | Charlier et al. |
| 8,036,634 B2 | 10/2011 | Dimeo et al. |
| 2001/0044302 A1 | 11/2001 | Okuyama |
| 2002/0086718 A1 | 7/2002 | Bigwood et al. |
| 2005/0037730 A1 | 2/2005 | Montague |
| 2005/0048948 A1 | 3/2005 | Holland et al. |
| 2005/0119030 A1 | 6/2005 | Bauchot et al. |
| 2005/0222933 A1 | 10/2005 | Wesby |
| 2006/0071804 A1 | 4/2006 | Yoshioka |
| 2006/0165015 A1 | 7/2006 | Melick et al. |
| 2006/0217105 A1 | 9/2006 | Kumar et al. |
| 2006/0224305 A1 | 10/2006 | Ansari et al. |
| 2006/0262103 A1 | 11/2006 | Hu et al. |
| 2006/0288053 A1 | 12/2006 | Holt et al. |
| 2007/0050248 A1 | 3/2007 | Huang et al. |
| 2007/0053513 A1 | 3/2007 | Hoffberg |
| 2007/0142028 A1 | 6/2007 | Ayoub et al. |
| 2007/0171854 A1 | 7/2007 | Chen et al. |
| 2007/0203643 A1 | 8/2007 | Ramaswamy et al. |
| 2007/0243853 A1 | 10/2007 | Bumiller et al. |
| 2007/0264990 A1 | 11/2007 | Droste et al. |
| 2007/0281603 A1 | 12/2007 | Nath et al. |
| 2008/0039018 A1 | 2/2008 | Kim |
| 2008/0080687 A1 | 4/2008 | Broms |
| 2008/0139118 A1 | 6/2008 | Sanguinetti |
| 2008/0140665 A1 | 6/2008 | Ariel et al. |
| 2008/0143497 A1 | 6/2008 | Wasson et al. |
| 2008/0180237 A1 | 7/2008 | Fayyad et al. |
| 2008/0208446 A1 | 8/2008 | Geelen et al. |
| 2008/0243545 A1 | 10/2008 | D'Ambrosia et al. |
| 2009/0002145 A1 | 1/2009 | Berry et al. |
| 2009/0099732 A1 | 4/2009 | Pisz |
| 2009/0149153 A1 | 6/2009 | Lee |
| 2009/0186596 A1 | 7/2009 | Kaltsukis |
| 2009/0187300 A1 | 7/2009 | Everitt et al. |
| 2009/0253403 A1 | 10/2009 | Edge et al. |
| 2009/0261958 A1 | 10/2009 | Sundararajan |
| 2010/0058333 A1 | 3/2010 | Peterson |
| 2010/0076764 A1 | 3/2010 | Chengalvaraya |
| 2010/0097239 A1 | 4/2010 | Campbell et al. |
| 2010/0227582 A1 | 9/2010 | Berry et al. |
| 2010/0323657 A1 | 12/2010 | Barnard et al. |
| 2010/0330972 A1 | 12/2010 | Angiolillo |
| 2011/0003578 A1* | 1/2011 | Chen et al. ............. 455/404.1 |
| 2011/0028118 A1 | 2/2011 | Thomas |
| 2011/0098016 A1 | 4/2011 | Hatton |
| 2011/0201302 A1 | 8/2011 | Hatton |
| 2011/0202233 A1 | 8/2011 | Hatton |
| 2011/0230159 A1 | 9/2011 | Hatton |

FOREIGN PATENT DOCUMENTS

| | | |
|---|---|---|
| EP | 2219163 A1 | 1/2009 |
| WO | WO2008011432 A2 | 1/2008 |

OTHER PUBLICATIONS

Ford Motor Company, "SYNC," Owner's Guide Supplement, SYNC System Version 1 (Nov. 2007).

Ford Motor Company, "SYNC with Navigation System," Owner's Guide Supplement, SYNC System Version 2 (Oct. 2008).

Ford Motor Company, "SYNC," Owner's Guide Supplement, SYNC System Version 2 (Oct. 2008).

Ford Motor Company, "SYNC with Navigation System," Owner's Guide Supplement, SYNC System Version 3 (Jul. 2009).

Ford Motor Company, "SYNC," Owner's Guide Supplement, SYNC System Version 3 (Aug. 2009).

Kermit Whitfield, "A hitchhiker's guide to the telematics ecosystem", Automotive Design & Production, Oct. 2003, http://findarticles.com, pp. 1-3.

Wayne Thalls, "Santa Cruz Ares Handbook", Santa Cruz Ares 1990, pp. 1-29.

* cited by examiner

METHOD AND SYSTEM FOR EMERGENCY CALL PLACEMENT

CROSS-REFERENCE TO RELATED APPLICATIONS

This application is a divisional of U.S. application Ser. No. 13/036,979, filed Feb. 28, 2011, the disclosure of which is incorporated in its entirety by reference herein. This application is related to U.S. application Ser. No. 11/769,346, entitled "METHOD AND SYSTEM FOR EMERGENCY NOTIFICATION", filed Jun. 27, 2007; and to U.S. application Ser. No. 12/399,513, entitled "METHOD AND SYSTEM FOR EMERGENCY CALL HANDLING", filed Mar. 6, 2009; and to U.S. application Ser. No. 12/607,244, filed Oct. 28, 2009, entitled "METHOD AND SYSTEM FOR EMERGENCY CALL PLACEMENT".

BACKGROUND

1. Technical Field

The illustrative embodiments generally relate to a method and system for emergency call handling.

2. Background Art

ONSTAR offers a SAFE & SOUND program in which a human "Advisor" fields emergency calls from ONSTAR-equipped vehicles. Calls are manually initiated at the vehicle either by depressing an emergency button located within the passenger compartment (e.g. below the rear-view mirror) or automatically initiated upon deployment of an air bag in the event of a collision. Collisions may be detected using one or more accelerometers or other impact detecting devices mounted within the vehicle.

An emergency call from an ONSTAR-equipped vehicle to the Advisor switchboard indicates the geographic location of the vehicle, and places the Advisor in voice communication with the passenger compartment. The Advisor attempts to communicate with the occupant(s) of the vehicle to determine the severity and circumstances of the incident giving rise to the emergency call. If the Advisor determines that emergency attention is necessary, either because of the occupant response(s), or because there was no response indicating that the occupant(s) may be ejected and/or severely injured, the Advisor dispatches emergency responders closest to the reported location of the vehicle.

U.S. Pat. No. 7,119,669 titled "Method And Apparatus For Detecting Vehicular Collisions" describes a cellular telephone that is equipped with technology for detecting a vehicular collision. This system is portable and operates independently, without the need of embedded vehicular sub-systems, such as an accelerometer to detect collisions or a global positioning system to detect vehicle velocity and location. These subsystems are embedded into the cellular telephone described in the '699 patent. The '699 patent describes communicating electronic data, such as the magnitude, time and location of the collision to authorities in the even a collision is detected. The '699 patent also describes playing prerecorded messages about the device's owner, including medical information. The '699 patent describes various software "filters" for screening out "false positives" or "false collision detections" to avoid unnecessarily contacting emergency responders in non-emergency situations, such as when the cellular telephone is accidentally dropped.

U.S. Pat. No. 5,918,180 titled "Telephone Operable Global Tracking System For Vehicles" describes a system for tracking vehicles using a cellular telephone and global positioning system that is located in the vehicle. The system also includes a speech synthesizer circuit that converts the digitally-encoded coordinates into speech for enunciating the vehicle location through the cellular telephone. By calling the cellular telephone from a remote location, the owner of the vehicle can determine its location. The '180 patent also describes using the system to call the police.

U.S. Pat. No. 5,555,286 titled "Cellular Phone Based Automatic Emergency Vessel/Vehicle Location System" describes a navigation unit that receives GPS data, and upon receipt of an activation event such as an airbag deployment, causes DTMF tones to be generated in a cellular telephone for dialing an emergency responder. The geographic location information and the identity of the vehicle are synthesized into voice and are then communicated to the emergency responder using the cellular telephone connection.

SUMMARY

In one illustrative embodiment, a vehicle communication system includes a computer processor in communication with persistent and non-persistent memory. The system also includes a local wireless transceiver in communication with the computer processor. The local wireless transceiver may be configured to communicate wirelessly with a cellular telephone located at the vehicle. The persistent memory includes an application for execution by the computer processor to communicate an emergency call command signal from local wireless transceiver to the cellular telephone in the event a vehicle emergency is detected at the computer processor, causing the cellular telephone to place an emergency call to an emergency responder or agency over the cellular telephone network. Because vehicle power to the computer processor and local wireless transceiver may be lost in the event of an emergency, the system may also include a backup power circuit comprising a charge storage device such as a local battery or capacitor having enough charge to power the computer processor and local wireless transceiver long enough to initiate the emergency call at the cellular telephone.

In another illustrative embodiment, a vehicle communication system includes a computer processor in communication with persistent and non-persistent memory. The system also includes a local wireless network transceiver in communication with the computer processor. The local wireless network transceiver may be configured to communicate wirelessly with a remote wireless network transceiver connected to a computer network, such as the Internet.

The persistent memory includes an application for execution by the computer processor to communicate an emergency call signal from local wireless network transceiver to the remote wireless network transceiver in the event of an emergency at the vehicle. The remote wireless network transceiver converts the received signal into one or more packets for transmission over the computer network to notify an emergency responder or agency that an emergency has occurred at the vehicle. The packets may be routed to a network router to route the packets to the appropriate network address for addressing the emergency. The appropriate network address may be based on criteria including but not limited to the network address of the remote wireless transceiver, or the location of the vehicle as defined by vehicle location information included with the emergency call signal. The vehicle location information may be supplied to the computer processor at the vehicle by a global positioning system. The packets may include data or attributes identifying the packets as emergency call packets for facilitating routing through the computer network.

One or more illustrative embodiments may include an apparatus and process for maintaining continuous connectivity between the vehicle emergency response module and at least one cellular telephone or other wireless communication device within the vehicle. Appropriate notifications and status indicators may be provided to inform vehicle occupants that connectivity is established, or broken.

In addition to notifying vehicle occupants, in one or more illustrative embodiments it may be desirable to notify a control system within the vehicle of the status of an emergency call. For example, this could be useful in determining if a call is connected, dropped, transferred, etc. According to a one aspect of the illustrative embodiments, upon the activation of one or more crash-related sensors, for example, a restraint control module (RCM) that an eCall is being placed.

In illustrative embodiments, the call may continue to be transmitted until a confirmation state is set within a vehicle system. The confirmation state could confirm the answer of the call, or it could confirm that an actual operator has taken an action, or any other suitable call connection event. In these illustrative embodiments, once the call connection has been confirmed, the vehicle may stop attempting to place a call.

Additionally, in one or more illustrative embodiments, while an eCall is being placed, all other types of calls and data transfer may be blocked or otherwise suspended. This may help ensure that the resources of a nomadic device, such as a cell phone, PDA, etc., through which the call is being placed, are being used for the appropriate purpose.

Further, in one or more illustrative embodiments, when a crash is detected, a vehicle system may activate an SOS mode. The SOS mode may include, but is not limited to, activation of audible vehicle outputs such as the vehicle horn. Such noise may interfere with a call being placed, and, resultantly, the vehicle horn or other audible outputs (alarm, etc.) may be silenced while an eCall is being placed.

In one or more additional illustrative embodiments, an eCall transceiver or equivalent device may cause a call to be placed and/or transmit the status of an attempted call to other vehicle systems. A non-limiting list of exemplary status transmissions includes, but is not limited to: Call in Progress, Unsuccessful, Call Complete, Canceled, Configured OFF, and Normal. Other appropriate status conditions could also be transmitted.

In at least one embodiment, a specific key corresponding to a certain driver or driver class is present. (E.g., without limitation, a key given to children driving a car). In this instance, the presence of the specific key in the ignition may prevent the emergency call system from being turned off.

In yet further illustrative embodiments, a driver/passenger may elect to make a call private. This transfers control of the call from a vehicle system (mic and speakers) to the nomadic device through which the call is being made. Additionally, many vehicles automatically terminate vehicle power if the vehicle is turned off and/or the vehicle door(s) are opened. While useful for turning off, for example, the radio, such a system would typically result in cessation of a call. In order that the call not be lost, when such an event occurs (e.g., vehicle turned off, and/or doors opened), control of the call is automatically transferred to the nomadic device. This prevents calls being lost if the passenger must flee the vehicle due to risk of fire or other hazard, or if the passenger simply wishes to leave the vehicle, but continue the call.

Yet another aspect of one or more illustrative embodiments activates the cellular telephone to dial a telephone number of a predefined contact other than an emergency responder, and communicate the speech signals to the predefined contact.

In another illustrative embodiment, a vehicle computing system includes a computer processor in communication with persistent and non-persistent memory and a local wireless transceiver in communication with the computer processor and configured to communicate wirelessly with a cellular telephone located at the vehicle. In this illustrative embodiment, upon detection of an emergency event, the computer processor may initiate a connection to an emergency communication system through the cellular telephone. The processor may further send spoken communication through the cellular telephone to the emergency communication system.

According to this embodiment, the processor may also present a plurality of spoken options to an emergency operator.

In this embodiment, the processor may detect the selection of an option, and, in response to the selection of an option, to output the appropriate data corresponding to the selected option.

In yet another illustrative embodiment, a vehicle computing system includes a computer processor in communication with persistent and non-persistent memory and a local wireless transceiver in communication with the computer processor and configured to communicate wirelessly with a cellular telephone located at the vehicle.

In this embodiment, upon detection of an emergency event, the computer processor may determine if a communication device is connected to the vehicle computing system.

If a communication device is not connected to the vehicle computing system, the processor may search for a connectable communication device and automatically connect to an available connectable communication device.

Once the processor is automatically connected to the communication device, the processor may place an emergency communication using the communication device.

In another illustrative embodiment, a machine readable storage medium stores a plurality of machine readable instructions that, when executed by a vehicle computing system, cause the system to, upon detection of an emergency event, determine if a communication device is connected to the vehicle computing system.

If a communication device is connected to the vehicle computing system, the system is caused to place an emergency call using the communication device.

If a communication device is not connected to the vehicle computing system, the system is caused to search for a connectable communication device.

Finally, if a connectable communication device is found, the system is caused to automatically connect to the communication device.

In yet a further illustrative embodiment, a method of call arbitration includes connecting a vehicle computing system to a remote phone system. In this illustrative embodiment, the vehicle computing system is used to transmit a pre-recorded or dynamically generated message to the remote phone system. The vehicle computing system also receives an outgoing message spoken in the vehicle to the remote phone system.

In this illustrative embodiment, the pre-recorded or dynamically generated message and the outgoing message are combined into a first signal for relay to the remote phone system as a single message.

Further, the vehicle computing system receives an incoming spoken message from the remote phone system. Finally, the received incoming message and the pre-recorded or dynamically generated message are combined into a second signal for playback as a single message through a vehicle audio system.

In another illustrative embodiment, a method of messaging includes transmitting a first message to a remote phone system, using a vehicle computing system, in a language in which the vehicle computing system is operating.

The method further includes determining if the message should be transmitted in a second language, and, based on the determining, transmitting the message in the second language. The message to be transmitted is assembled from a set of emergency words and phrases in the second language.

In another illustrative embodiment, a computer readable storage medium stores instructions that, when executed, cause a vehicle computing system to perform a method. The method includes placing a phone call from a vehicle computing system to a remote phone system and transmitting a pre-recorded or dynamically generated message to the remote phone system.

The method also includes receiving an outgoing message spoken in the vehicle to the remote phone system and combining the pre-recorder or dynamically generated message and the outgoing message into a first signal for relay to the remote phone system as a single message.

Further, the methods includes receiving an incoming spoken message from the remote phone system and combining the received incoming message and the pre-recorded or dynamically generated message into a second signal for playback as a single message through a vehicle audio system.

In yet another illustrative embodiment, an emergency response system includes a restraint control module (RCM), a global positioning system module (GPSM), at least one output, at least one input, an SPDJB, and a vehicle associated computing system (VACS) in communication with the RCM, the GPSM, the at least one output, the at least one input and the SPDJB. In this illustrative example, upon detection of an emergency event, the RCM requests that the VACS place an emergency call.

Upon receiving a request from the RCM, the VACS queries the GPSM to obtain vehicle coordinates, informs the occupant of the onset of the call, and instructs a wireless device in communication with the VACS to place an emergency call The VACS is further operable to determine when an emergency call is connected. Once the emergency call is connected, the VACS relays a message indicating connection to the RCM, and further contacts the Smart Power Distribution Junction Box (SPDJB).

In another illustrative embodiment, implemented by a vehicle associated computing system (VACS), a method includes monitoring for an emergency event. If an emergency event is detected, the process indicates an attempt to dial an emergency number and determines if a wireless connection is enabled. If a wireless connection is not enabled, the process enables the wireless connection.

The illustrative process further includes determining if a wireless device is connected to the VACS. If a wireless device is not connected to the VACS, the process connects to a wireless device.

The process further includes determining if a call is currently in progress on the wireless device. If a call is currently in progress on the wireless device, the process cancels the call in progress. Also, the exemplary method includes placing an emergency call through the wireless device to an emergency operator, wherein placement of the call enables direct communication between a vehicle occupant and an emergency operator.

In yet another illustrative embodiment, a computer readable storage medium, stores instructions that, when implemented by a vehicle associated computing system (VACS), cause the VACS to perform the method including monitoring for an emergency event. If an emergency event is detected, the VACS indicates an attempt to dial an emergency number. The VACS also is caused to determine if a wireless connection is enabled and if a wireless connection is not enabled, enable the wireless connection.

The VACS is further caused to determine if a wireless device is connected to the VACS. If a wireless device is not connected to the VACS, the VACS connects to a wireless device.

The VACS is also caused to determine if a call is currently in progress on the wireless device. If a call is currently in progress on the wireless device, the VACS is caused to cancel the call in progress.

The VACS is additionally caused to place an emergency call through the wireless device to an emergency operator, wherein placement of the call enables direct communication between a vehicle occupant and an emergency operator.

These aspects of illustrative embodiments are not exclusive. Other aspects of the present invention are detailed in the following detailed description of the preferred embodiments, the accompanying figures and claims.

These figures are not exclusive representations of the systems and processes that may be implemented to carry out the inventions recited in the appended claims. Those of skill in the art will recognize that the illustrated system and process embodiments may be modified or otherwise adapted to meet a claimed implementation of the present invention, or equivalents thereof.

DETAILED DESCRIPTION

Figure 1:
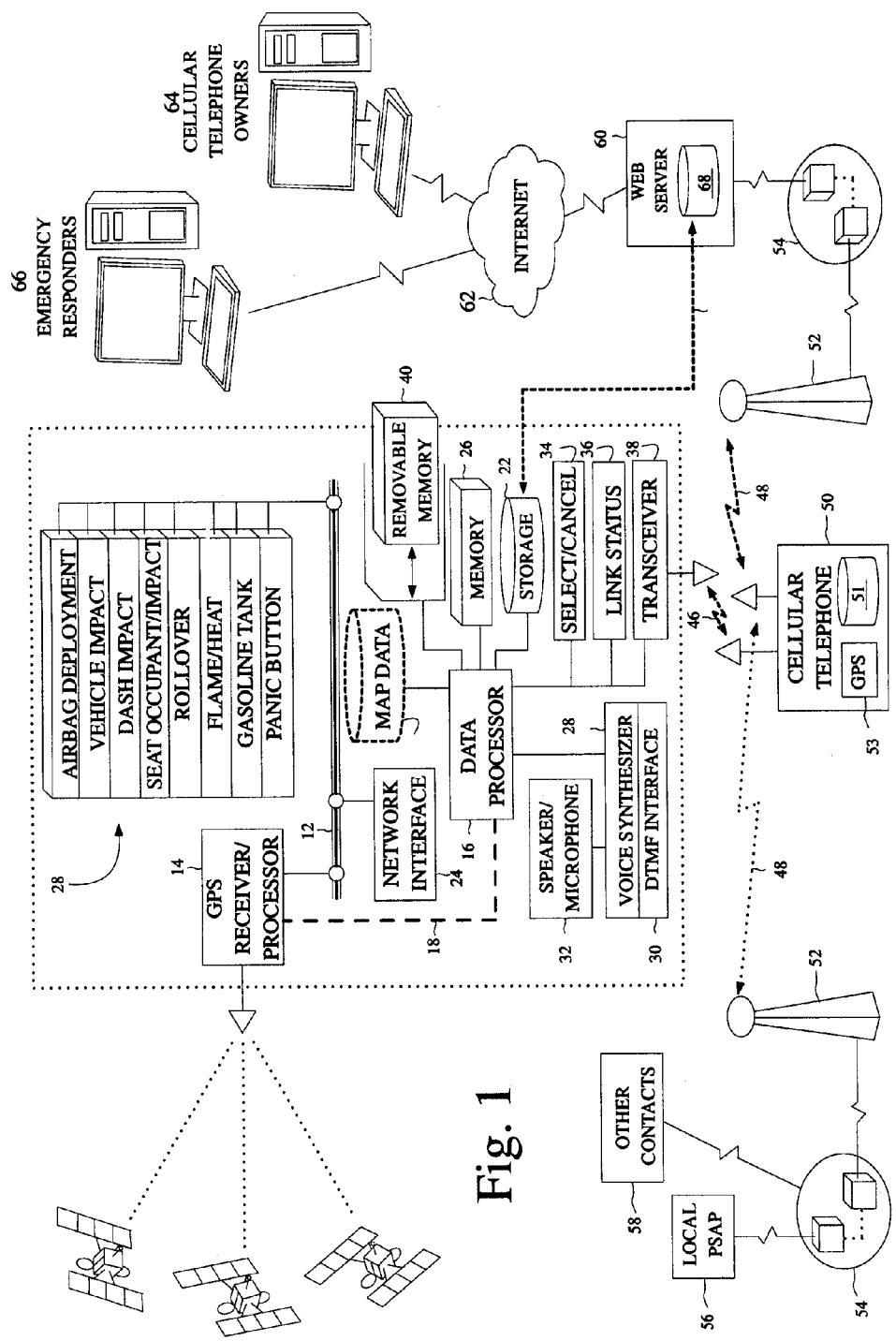
FIG. 1 is a system diagram illustrating exemplary physical aspects of one or more illustrative embodiments.

FIG. 1 illustrates a non-limiting physical system architecture which may be implemented to practice one or more illustrative embodiments. Block 10 generally comprises vehicle sub-systems, some of which may be interconnected by a vehicle network 12 such as a Controller Area Network or other suitable communication network.

Data processor 16 may receive and send information across vehicle network 12 through an appropriate network interface or bus adapter 24. Data processor 16 may be a traditional RISC or CISC processor in bus communication with general purpose volatile memory 26, and general purpose non-volatile or persistent storage 22, such as magnetic or flash memory, as is well known in the art. Removable memory 40 may also be provided, such as a compact flash card or a flash memory module having a Universal Serial Bus (USB) interface (not shown).

A global positioning signal receiver/processor 14 may be implemented to receive radio signals (e.g. the L1 frequency of 1575.42 MHz in the UHF band) from multiple satellites of the Navigation Signal Timing and Ranging (NAVSTAR) Global Positioning System. These signals may include a pseudorandom code identifying the transmitting satellite, ephemeris data and almanac data. The global positioning signal receiver/processor 14 may process this data to determine the two-dimensional location (e.g. latitude and longitude), the three-dimensional location (e.g. latitude, longitude and altitude), the velocity and/or the direction of the vehicle. Location, velocity and/or direction information calculated at the global positioning signal receiver/processor 14 may be communicated across vehicle network 12, and/or directly to data processor 16 via link 18.

Alternatively, a global positioning signal receiver/processor 53 may be a subsystem of cellular telephone 50. Information representing the global position of the cellular telephone, and thus the vehicle in which the cellular telephone is located, may be retrieved by data processor 16 via transceiver 38 and communication link 46.

The vehicle sub-systems may include a map database 20. Database 20, like general storage 22, may take several forms including but no limited to magnetic storage (e.g. a hard drive), optical storage (e.g. CD-ROM, DVD), flash memory, etc. Data processor 16 may determine a present street location and heading of the vehicle based on latitude, longitude and direction data received from GPS receiver/processor, and map data retrieved from database 20, as is well known in the art.

A plurality of emergency condition sensors 28 may be interfaced to vehicle network 28. Such sensors may include but are not limited to air bag deployment sensors, vehicle impact sensors, dash impact sensors, seat/occupant impact sensors, rollover sensors, flame/heat sensors, gasoline sensors and an occupant-activated panic button. These sensors may operate within individual processing modules (not shown), each having a separate interface (not shown) to the vehicle network 12 for sending signals indicating a plurality of different emergency conditions.

Another subsystem in communication with data processor 16 includes a voice synthesizer or decoder 28 for converting digital information received from the data processor 16 into audible speech signals, i.e. analog sound signals. The analog sound signals may be communicated through speaker 32, or processed at transceiver 38, for communication to cellular telephone 50 transceiver (not shown) across piconet 46 as discussed in greater detail below. A dual-tone multifrequency (DTMF) interface 30 may be provided for receiving analog DTMF frequencies and processing them as command signals to data processor 16, as is well known in the art of automated telephone menu systems.

Transceiver 38 may establish a piconet 46 with cellular telephone 50 or other available device. Cellular telephone 50 is an example of a transient cellular communication device that is not permanently integrated into the vehicle. Another example of a transient cellular communication device may be a laptop computer having cellular communication and piconet communication capabilities.

In one example, transceiver 38 may comprise a BLUETOOTH controller. Those of skill in the art will recognize that other transceivers may be used having different communication characteristics and performance. Other vehicle sub-systems include a link status indicator 36 for notifying vehicle occupants of the status of the communication link between transceiver 38 and cellular telephone 50. Statuses include, but are not limited to, available devices, paired, unpaired, connected, not connected, etc. In one illustrative embodiment, the status of the communication link is indicated on a liquid crystal display (LCD). In another illustrative embodiment, one or more light emitting diodes (LEDs) or other visual indicators are provided. In yet another illustrative embodiment, audible status notifications are provided through the vehicle sound system and/or speaker 32. Link status may be monitored by data processor 16 in conjunction with transceiver 38.

A select/cancel switch 34 may also interface with data processor 16 for push-button control over microprocessor/system functions as described in greater detail below. Select/cancel switch 34 may be a soft switch operating in conjunction with a LCD display, or a software switch operated by voice command received at microphone 32 and processed by voice synthesizer 28 and/or microprocessor 16.

A wide variety of different interconnections among subsystems and external communication networks may be practiced within the scope of the present invention, beyond those illustrated in FIG. 1. For example, a hard wire connection may be established between cellular telephone 50 and data processor 16, voice synthesizer 28, and/or DTMF interface 30. In another example, data processor 16 may be connected directly or indirectly to emergency sensor modules 28, and may monitor the ports to which the emergency sensor modules are attached instead of vehicle network 12.

In one or more illustrative embodiments, cellular telephone 50 establishes wireless communication 48 with terrestrial tower 52. Terrestrial tower 52 in turn established communication through telephone switching network 54 with emergency responder(s) 56. Emergency responders may include police, ambulance, a 911 public safety access point (PSAP), etc. as described in greater detail below. Terrestrial tower 52 may also establish communication through telephone switching network 54 with other contacts 58, as described in greater detail below. Based on the GPS position, for example, a call may be placed to the PSAP that is local to the vehicle's present position.

In one or more illustrative embodiments, terrestrial tower 52 may establish communication through telephone switching network 54 with a data interface (not shown) at web server 60. As described in greater detail below, data may be uploaded and downloaded communicated from associated database 68 to/from storage 22 associated with microprocessor 16, as illustrated by dashed line 70.

Web server 60 having associated storage 68 may host a plurality of web pages for Internet access 62 by a plurality of browsers, including but not limited to emergency responder(s) 66, cellular telephone owner(s) 64, healthcare providers, etc. As described in greater detail below, some browsers, such as cellular telephone owners 64 may upload data over Internet 62 to storage 68, and other browsers, such as emergency responders 66 may download data.

FIG. 2A illustrates system architecture of a second exemplary illustrative onboard communication system which can make use of the illustrative embodiments. A vehicle enabled with a communication system (VCS) may contain a visual front end interface 79 located in the vehicle. The user may also be able to interact with the interface if it is provided, for example, with a touch sensitive or capacitive touch screen. In another illustrative embodiment, the interaction occurs through audible speech and speech synthesis.

Figure 2:
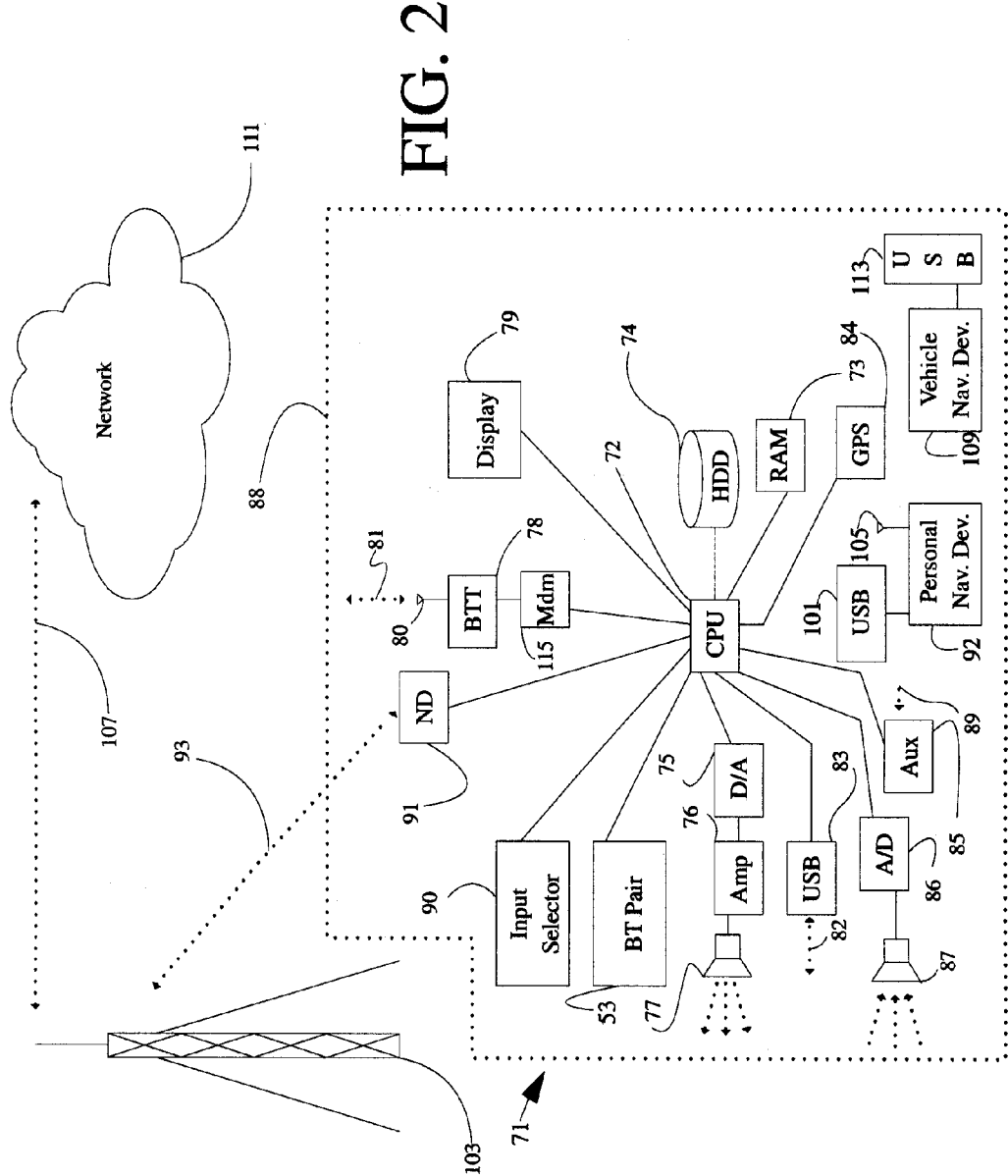
FIG. 2 shows an exemplary system for implementing an emergency call from a vehicle.

In the illustrative embodiment 71 shown in FIG. 2 a processor 72 controls the operation of the system. Provided within the vehicle itself, the processor allows onboard processing of commands and routines. Further, the processor is connected to both temporary 73 and permanent storage 74. In this illustrative embodiment, the temporary storage is random access memory (RAM) and the permanent storage is a hard disk drive (HDD) or flash memory.

The processor is also provided with a number of different inputs for the user to interface with the processor. In this illustrative embodiment, a microphone 87, an auxiliary input 85 (for input 89), a USB input 83, a GPS input 84 and a BLUETOOTH input 78 are all provided. An input selector 90 is also provided, to allow a user to swap between various inputs. Alternatively, inputs may be automatically selected using circuitry and programming to determine at which input a signal is available. In one embodiment, this may be accomplished by comparing signals or signal levels at the various inputs. Input to both the microphone and the auxiliary connector is converted from analog to digital by a converter 86 before being passed to the processor.

Outputs to the system can include, but are not limited to, a visual display 79 and a speaker 77 or stereo system output. The speaker is connected to an amplifier 76 and receives its signal from the processor 72 through a digital-to-analog converter 75. Output can also be made to a remote BLUETOOTH device (not shown) or a USB device (not shown) along the bi-directional data streams shown at 81 and 82 respectively. Alternatively, audio output may be channeled through the vehicles audio/stereo system.

In one illustrative embodiment, the system 71, uses the BLUETOOTH transceiver 78 to communicate 80 with a user's nomadic device 91 (e.g., cell phone, smart phone, PDA, etc.). The nomadic device can then be used to communicate 107 with a network 111 outside the vehicle 88 through, for example, communication 93 with a cellular tower 103.

Pairing a nomadic device 91 and the BLUETOOTH transceiver 78 can be instructed through a button 91 or similar input, telling the CPU that the onboard BLUETOOTH transceiver will be paired with a BLUETOOTH transceiver in a nomadic device.

Data may be communicated between CPU 72 and network 111 utilizing a data-plan associated with nomadic device 91. Alternatively, it may be desirable to include an onboard modem 115 in order to transfer data between CPU 72 and network 111 over the voice band. In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). In another embodiment, nomadic device 91 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). If the user has a data-plan associated with the nomadic device, it is possible that the data-plan allows for broad-band transmission and the system could use a much wider bandwidth (speeding up data transfer). In still another embodiment, nomadic device 91 is replaced with a cellular communication device (not shown) that is affixed to vehicle 88.

In another alternative embodiment, CPU 72 may interface with a LAN/WAN wireless transceiver (not shown) for communicating with Network 111 via non-cellular wireless link, such as Wi-Fi, WIMAX, etc. Nomadic device 91 may include the LAN/WAN wireless transceiver.

Additional inputs and or devices may include a personal navigation device 92, having, for example, a USB connection 101, and/or an antenna 105, or a vehicle navigation device 109, having a USB 113 or other connection, an onboard GPS device 84, or remote navigation system (not shown) having connectivity to network 111.

FIG. 2B shows an exemplary system for implementing an emergency call from a vehicle. In this illustrative embodiment, a Restraint Control Module (RCM) 301. The RCM communicates with an e-call Receiver 302, a cluster 307, and a BCM (Body Control Module). The RCM determines if an accident has occurred, and receives inputs from 317,318,319, as well as the ecall Receiver and the BCM. If an accident occurs, the RCM sends a signal to the ecall Receiver instructing processing of an emergency call.

The ecall Receiver 302 communicates bi-directionally with a nav screen 305, a CID (Cockpit Integrated Display) 320, and a mobile phone 308 (used to communicate with a 911 operator 309. The ecall Receiver may receive inputs from, for example, a mirror microphone 304 in communication with the BCM. Communication with the nav screen allows the Receiver to display relevant e-call information, and may give the Receiver access to the speakers. Communication with the cell phone (or other portable device) allows the Receiver to communicate with emergency services.

The BCM may receive inputs from the ignition switch 312, a stop/start switch 310, and/or a door ajar switch 311. The BCM may communicate with the nav screen as well.

A steering wheel switch 314 may be in communication with a radio switch 306, the nav screen, the driver 316, and the ecall Receiver. An electronic finish panel (EFP) 313 may also be in communication with the driver and the ecall Receiver.

The nave screen and the radio may both be in communication with the vehicle speakers 315.

Figure 3:
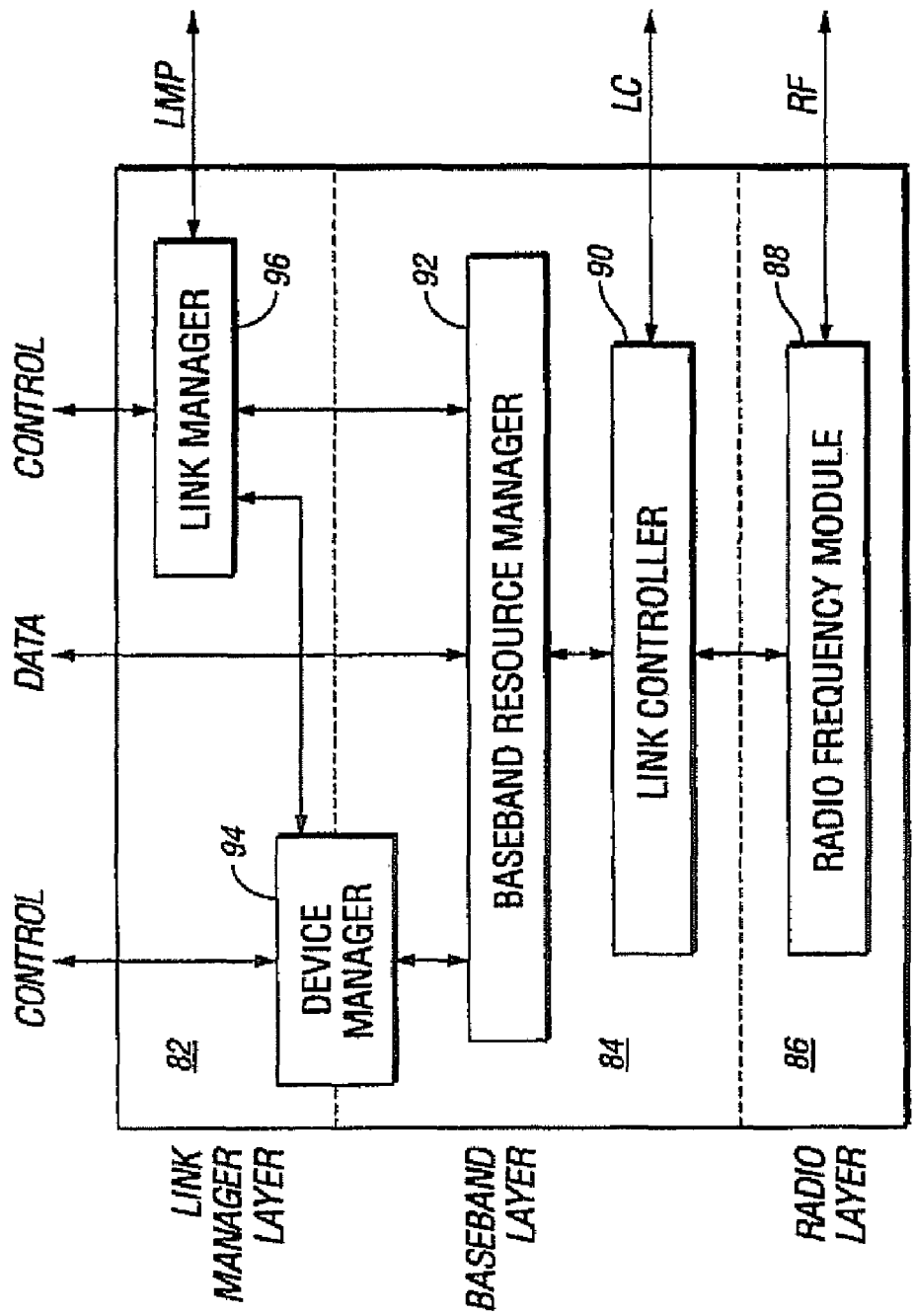
FIG. 3 is a block diagram of a BLUETOOTH controller which may be implemented to support the illustrative embodiments.

As illustrated in FIG. 3, a BLUETOOTH controller may include a link manager layer 94, a baseband layer 95 and a radio layer 96. In an illustrative embodiment, the radio layer 96 may include a radio frequency module 97 operating at 2.4 GHz using binary frequency modulation.

Baseband layer 95 may include a baseband resource manager 99 for managing the exchange of data between connected devices over logical links and logical transports, as well as the use of the radio medium to carry out inquiries, make connections, or be discoverable.

Baseband layer 95 may also include a link controller 98 which handles encoding and decoding of BLUETOOTH packets from the data payload and parameters related to the physical channel, logical transport and logical link. The link controller 98 carries out the link control protocol signaling that is used to communicate flow control and acknowledgment and retransmission request signals.

Device manager 100 controls the general behavior of the BLUETOOTH enabled device. It is responsible for operation of the BLUETOOTH system that is not directly related to data transport, such as inquiring for the presence of other nearby devices, connecting to other devices or making the local device discoverable or connectable by other devices.

The link manager layer 94 may include a link manager for managing the creation, modification, and release of logical links and/or logical transports, as well as the update of parameters related to physical links between devices. The link manager may achieve this by communicating with the link manager in remote BLUETOOTH devices using the link management protocol (LMP). The LMP allows the creation of new logical links and logical transports between devices when required, as well as the general control of link and transport attributes such as the enabling of encryption on the logical transport, the adapting of transmit power on the physical link or the adjustment of QoS settings for a logical link.

Figure 4:
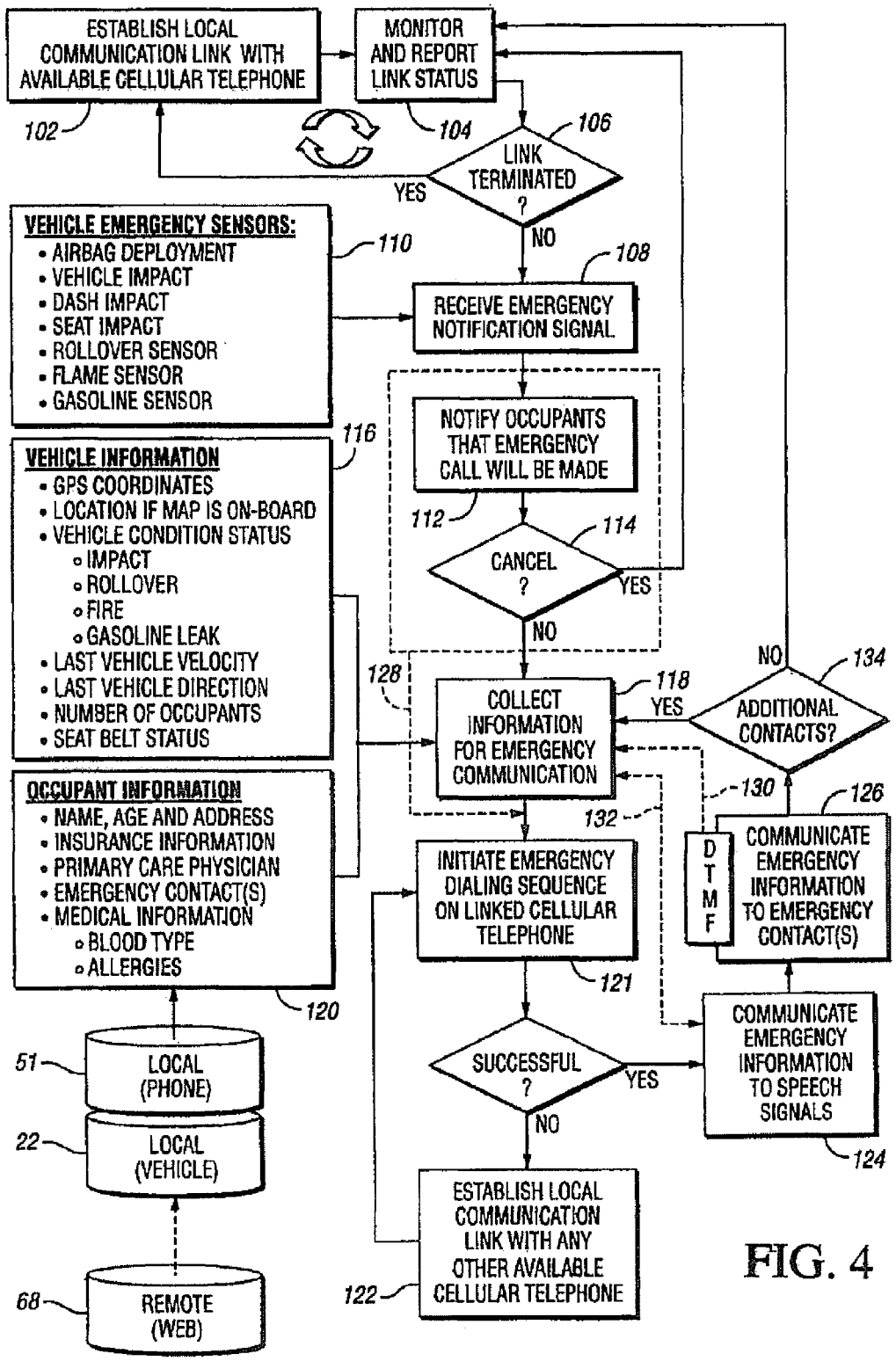
FIG. 4 is a flow diagram illustrating an exemplary process of one or more illustrative embodiments.

FIG. 4 illustrates an example algorithm for implementing one or more illustrative embodiments. Those of skill in the art will recognize that the scope of the present invention is not limited to the specific algorithm illustrated in FIG. 4. The illustrated process may be modified to fit any illustrative embodiments. The processes illustrated in FIG. 4 may be implemented by one or more processors, such as data processor 16 illustrated in FIG. 1. No particular type of processor or configuration is required.

At step 102, a local communication link may be established with an available cellular telephone in or nearby the vehicle passenger compartment. The link may be a BLUETOOTH piconet, or other suitable short-range network, wired or wireless. At steps 104 and 106, the status of the communication link may monitored on a continuous or basis, or at regular intervals. The status of the link may include the connectivity of the paired cellular telephone, the signal strength, the identity of other available devices, etc. described with respect to FIG. 1, link status may be reported by LCD display, LED, or audibly. Preferably, a warning or other notification is provided to passengers within the vehicle compartment when a link is disrupted, or when no link is available.

At step 108, an emergency notification signal is received from vehicle emergency sensors 110. Vehicle emergency sensors 110 may include but are not limited to: air bag deployment sensors, air curtain deployment sensors, thorax deployment sensors, knee bolster deployment sensors, adaptive can vent and/or tether deployment sensors vehicle impact sensors, dash impact sensors, seat impact sensors, rollover sensors, flame sensors, gasoline sensors, fuel cutoff sensors, etc. Emergency signals from these sensors may be received at data processor 16 directly by wire, wirelessly, or over vehicle network 12.

Upon receipt of an emergency notification signal, the system may notify occupants of the vehicle, at step 112, that an emergency call to one or more emergency responders 56 or other contacts 58 is going to be made at cellular telephone 50. Occupant notification is preferably done audibly using voice synthesizer 28 and speaker 32 which may or may not be a component of the vehicle sound system. The following is an example notification:

"Warning. A safety sensor in this vehicle has detected a vehicle collision. The vehicle safety system will automatically contact emergency responders in 10 seconds. Press your cancel button or say CANCEL if you want to terminate this call."

Of course, an unlimited number of different notifications may be provided. They may be pre-recorded, predefined, or dynamically created based on the particular emergency detected and/or the particular occupant(s) within the vehicle. The notification may also be repeated one or more times. At step 114, the vehicle occupants are provided with an opportunity to cancel the emergency call using the select/cancel switch 22 or a voice command received at microphone 32 and voice synthesizer 28. If a cancellation signal is received, the process stops, and returns to monitoring link status at block 104.

If the emergency call is not terminated at 114, emergency information is collected at step 118. Emergency information may include vehicle information 116 and occupant information 120. Vehicle information 116 may include latitude, longitude, direction, last velocity, etc from GPS receiver/processor 14, street location if the vehicle is equipped with map data 20, vehicle type/color, vehicle emergency condition (e.g., impact, fire, rollover, fire, gasoline leak, etc.), number of occupants, seat belt status, airbag deployment, fuel cutoff status, etc. Occupant information 120 may include name, age, address, blood type, medical allergies, medical condition, insurance information, physician information, emergency contact(s), etc. Emergency information may be stored in a plurality of storage locations including memory 26, storage 22, removable memory 40, or storage 51 associated with cellular telephone 50.

Occupant identification may be determined by the owner of the cellular telephone 50 paired with transceiver 38, voice input at microphone 32, user input at a vehicle console display (not shown), or other means including key identifier, memory key identifier, etc.

After emergency information is collected at step 118, another occupant notification may be made warning the occupant(s) that an emergency call is going to be made, and providing the occupant(s) with an opportunity to cancel the call, as described above with respect to steps 112 and 114. This step is represented by dashed lines 128.

If the emergency call is not canceled, transceiver 38 such as a BLUETOOTH controller may initiate a call on cellular telephone 50 to one or more emergency responders 56 or other contacts 58 at step 121. If a call cannot be initiated, the system attempts to establish connection with another cellular telephone in or nearby the vehicle as represented at block 122, and communicate the emergency information as represented at block 121.

At step 124, elements of vehicle information 116 and/or occupant information 120 may be synthesized into speech signals at voice synthesizer 28 and read to the terminating party 56 or 58 as indicated at block 126. In one or more illustrative embodiments, the data processor 16 and the voice synthesizer 28 provide the terminating party 56 or 58 with touch tone DTMF menu options for repeating and retrieving the various elements of vehicle information 116 and/or occupant information 120. This process is illustrated with dashed lines 130 and 132.

Further, any speech signals presenting this information, directly or as a selectable option from a menu, may begin transmission immediately upon connection to the terminating party. Certain emergency systems require a caller to press 1 to verify that an emergency call should be placed, but this requirement can be bypassed by presentation of speech. By having the speech begin when an emergency call is answered, the system is able to avoid nuanced system requirements to ensure the call is completed.

If the occupant(s) have identified additional contacts 58 for reporting emergency information, those entities may be contacted, and emergency information may be reported, as represented by step 134.

As illustrated in FIG. 1, emergency responders 66 and cellular telephone/vehicle owners 64 may be provided with Internet access to web server 60 having associated storage 68. Cellular telephone/vehicle owners 64 may access one or more Web pages hosted at server 60 for defining the emergency information to be provided to emergency responders 56 and 66, and/or the manner in which that information is provided. For example, cellular telephone/vehicle owners 64 may specify their name, age (date of birth), address, blood type, medical allergies, medical conditions, physician, emergency contact persons, etc. Cellular telephone/vehicle owners 64 may specify which of this information is disclosed to emergency responders 56 and/or 66 in the event of an emergency. The emergency information may be uploaded to cellular telephone storage 51 via cellular link 48, and/or to in-vehicle storage 22 for reporting via voice synthesizer 28 to emergency responders 56 and other contacts 58 in the event of an emergency.

The emergency information may also be stored in a database 68 associated with web server 68 for Internet access by emergency responders 66 in the event of an emergency. In one embodiment, speech transmission to emergency responders 56 includes instructions for accessing occupant emergency information at server 60 over the Internet 62. In this manner, emergency responders 56 and/or 66 can readily access all of an occupant's emergency information.

Figure 5:
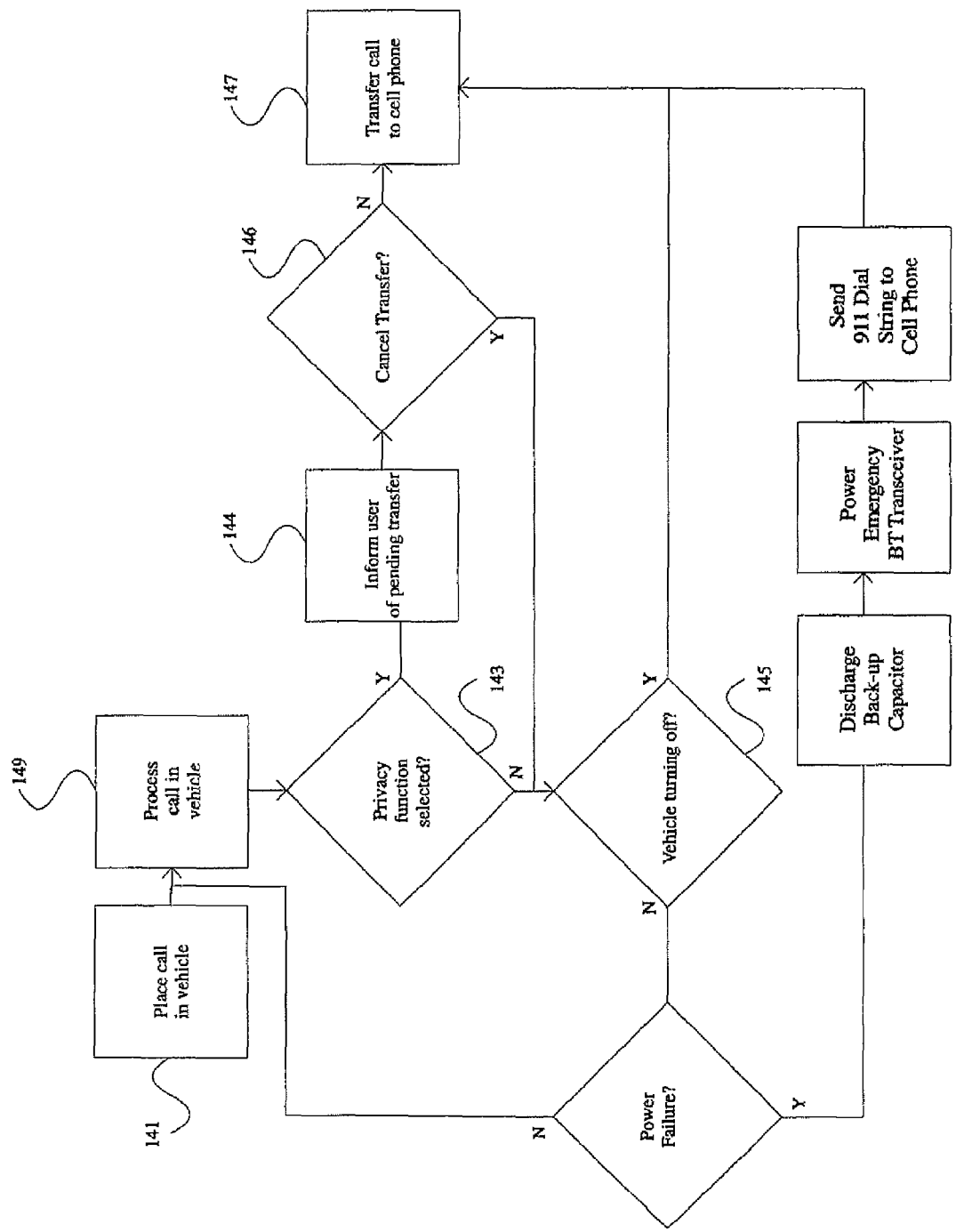
FIG. 5 is an exemplary flow showing one or more possible selectable and/or automatic transmission modes for an eCall in progress.

FIG. 5 is an exemplary flow showing one or more possible selectable and/or automatic transmission modes for an eCall in progress. Typically, when an eCall is placed, with above-described embodiments, incoming voice is played through vehicle speakers and outgoing voice is recorded at a vehicle based microphone 141. In certain instances, however, it may be desirable to have the call transferred to the nomadic device, eliminating the vehicle systems.

One non-limiting example would be if the system 71 is provided with a privacy function. If a privacy function is selected 143, the call might be transferred to the nomadic device 147. The user might also be given a notification or a warning that this is about to occur 144, and be given an opportunity to physically or verbally cancel the transfer 146. As one example, if the vehicle was in an accident, and a user was trapped, and something shifted and triggered the privacy feature. The user may be unable to physically cancel the transfer to an unreachable cell phone, so the user would vocally cancel the transfer. On the other hand, local noise (e.g. kids, traffic, etc) might make the call hard to hear and/or might make it hard for the operator to hear the user, so it might be desirable to transfer the call to a handset.

Even if a user-directed transfer is not processed, it may be desirable to transfer the call automatically 145. One non-limiting example of a situation where this could occur is if the vehicle power was turned off or fails. In one embodiment, if the vehicle is turned off, the call can be automatically transferred before the power down occurs, so the call is not lost. In such a case, CPU 72 would cause the call to be transferred to the nomadic device 147.

In an alternative embodiment, circuitry may be implemented for a situation in which vehicle power fails or is lost due to an accident or other event as illustrated in block 300. One aspect of the circuitry may include a capacitor having and holding a certain charge while the vehicle is under normal 12 volt electrical power. In the event vehicle power is lost, the circuitry may discharge enough charge from the capacitor to power a BLUETOOTH transceiver as illustrated in blocks 301 and 302. The BLUETOOTH transceiver then generates a dial string for transmission to the Nomadic device to make an emergency call and notify emergency responders that an accident has occurred as indicated in block 303.

In one non-limiting implementation of this embodiment, the dial string may include a series of commas before "911" to permit the occupant to cancel the emergency call if it is unnecessary.

Figure 6:
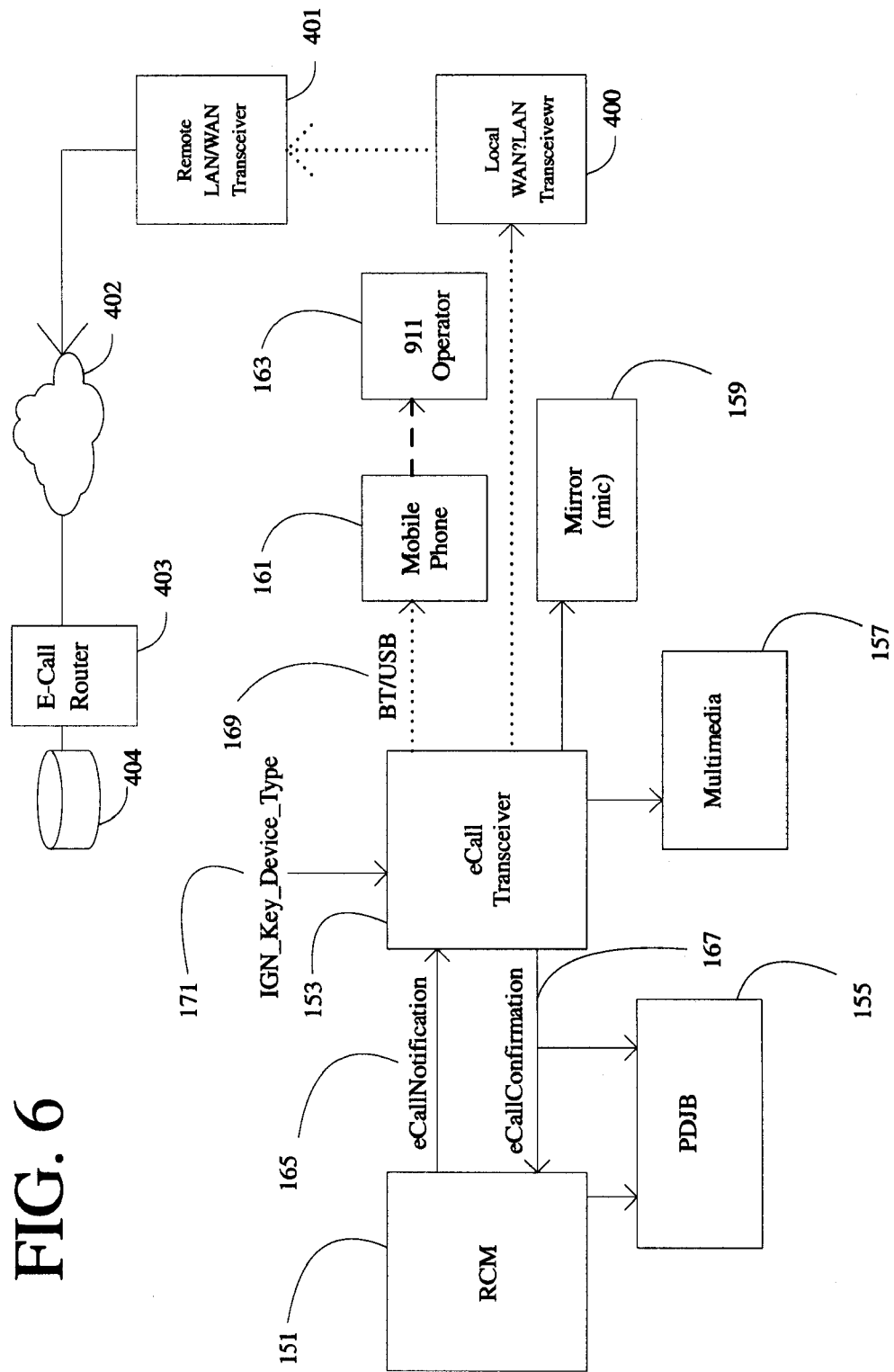
FIG. 6 is an exemplary illustrative diagram of an exemplary system for placing an eCall.

FIG. 6 is an exemplary illustrative diagram of an exemplary system for placing an eCall. Exemplary vehicular devices include an RCM 151, an eCall receiver 153, a mirror (or other physical installation) containing a microphone 159, one or more media outputs 157, and a power distribution juncture box 155 (PDJB).

According to one or more illustrative embodiments, when the RCM or equivalent device registers a qualified crash event, the RCM notifies 165 the eCall receiver.

The eCall receiver may have several functions to perform. It may remain in contact with the RCM 167 to report when a call has been placed. This may permit the RCM to stop requesting a call from eCall receiver 153. It may also receive user input through a microphone, and play back operator input through a media output. Additionally, the eCall receiver 153 may maintain a BLUETOOTH, USB, etc. connection to a nomadic device 161, through which a call can be placed to a 911 operator 163.

The PDJB (Power Distribution Junction Box) may, among other things, activate SOS features when a crash occurs. These could include flashing lights, honking horns, car alarms, etc. Since some of these features might interfere with a call, the PDJB may terminate the interfering features when a call is being placed and/or is connected. This will allow the driver to more easily communicate with the 911 operator.

In one non-limiting example, the horn and other audible devices are suppressed as long as a call is recognized as being in progress. In any other condition, the SOS signals, such as the horn, continue to sound in order to draw attention to the accident.

Further, it may be prohibited in certain areas to have a 911 autodialer, or a user may simply want to avoid calling 911 in the event of a minor crash. In these cases, among others, the vehicle may play a message to the driver when a 911 call is going to be placed. This could allow the driver an opportunity to cancel the outgoing call.

In at least one illustrative embodiment, a restraint control module (RCM) 151 and an eCall transceiver 153 are in communication with one another. In one embodiment, the RCM may regularly transmit a signal indicating that no eCall is requested. This signal can be updated, for example, every 150 ms, or any suitable update period.

Once a crash event is detected by the RCM (or other emergency detection module or system), on the next update (or upon the event if periodic communication is not implemented), the RCM 151 can send a signal requesting that eCall transceiver 153 make an eCall. The eCall transceiver 153 might also be in communication with the RCM, such that messages can be sent back. For example, when receiving a no-request signal, the eCall transceiver can reply with a signal indicating that no call has been requested. If a call request comes through, the eCall transceiver can transmit back a variety of signals to the RCM, including, but not limited to: call in progress, call completed, call canceled, call unsuccessful (e.g., no phone is connected for calling), or eCall is turned OFF. Additional or fewer communication states can be used as needed.

For example, if the RCM transmits a request for a call, it may continue transmitting the request as long as it is being signaled that a call is requested. Once the call has been, for example, placed, completed, cancelled, determined unsuccessful, etc., the RCM may return to transmitting a signal that no call is requested. Note, in this case, no call requested signal does not indicate that a call should be terminated, but rather, that one is not requested to be placed.

If the response is invalid, corrupted, not received, etc., the RCM might register the last valid received state as the presently received state. In such a case, if no indication that the call had been placed, completed, etc. had been validly received, then the RCM might continue to request a call. Or, if there is no last valid state saved, the RCM might default to registering a "normal" (i.e. no call placed) state, causing the request to again continue. This helps ensure that a call is requested until the RCM confirms the call has been placed.

In the event an eCall is requested and not canceled, eCall transceiver 153 may operate nomadic device 161 (e.g. mobile phone, PDA, etc.) to dial "911" or another emergency number. In one embodiment, eCall transceiver 153 may communicate with CPU 72 (FIG. 2) which in turn communicates with nomadic device 161. In an alternative embodiment, a wireless telephone may be fixed to the vehicle, or otherwise regularly travel with the vehicle.

In yet another alternative embodiment, the eCall transceiver 153 may include or be in communication with a wireless network access transceiver 400. Wireless network access transceiver 400 may be configured to communicate with a Wireless Local Area Network (LAN), Wide Area Network (WAN), Wi-Fi network, or the like, if such a wireless network exists within the vicinity of the vehicle.

In the event an emergency call is requested, the local LAN/WAN transceiver 400 at the vehicle may communicate wirelessly with a remote LAN/WAN transceiver 401 located remotely from the vehicle. Remote LAN/WAN transceiver 401, upon receiving a request for emergency call, may establish a connection with "911" call center 163. The connection may be established over network 402 (e.g. Internet) or by telephone switch. In one embodiment, an emergency call network switch 403 may be implemented to route an emergency call received at WAN transceiver 401 to the nearest 911 call center 163. In one embodiment, the IP address of the LAN/WAN transceiver 401 may be used to determine the approximate location of LAN/WAN transceiver 401. A lookup table 404 may be accessed to determine the IP address or telephone number of the nearest 911 call center to the location or IP address of the LAN/WAN transceiver 401. In another embodiment, the location of the vehicle may be determined by GPS module 84 (FIG. 2). That location may be communicated through local LAN/WAN transceiver 400 to remote WAN transceiver 401 together with the emergency call request. Emergency call switch 403 may receive this information and access look-up table 404 to determine the nearest 911 call center 163 based on the GPS information received from the GPS module 84. That nearest call center 163 may then be contacted by telephone, by network connection, or otherwise.

In an alternative embodiment, GPS module 84 may be an integral component of nomadic device 161. Vehicle location may be determined by accessing the GPS module 84 located within the nomadic device 161 or located within system 88 (FIG. 2).

Local WAN transceiver 400 is not limited to the proximity of a vehicle. It may be a component of a nomadic device (e.g. mobile phone, PDA, etc.), or even a hand-held device. A traditional LAN/WAN router/access point could also be configured to transmit an emergency call. The emergency call could be triggered by a button on the LAN/WAN network access device, or by another device that is in communication with the LAN/WAN network access device. In other words, a "telephone" is not necessary to make an emergency call utilizing this aspect of the present invention. Any network access point anywhere (not limited to a vehicle) could be configured to contact emergency call switch 403 for locating and contacting 911 call center 163 in the event of an emergency. This includes network access points located in the home, office, and those embedded within personal computers, laptop computers, cellular telephones and PDAs. Alternatively, network access points such as LAN/WAN routers may be configured to identify the IP address or other identifying information (such as telephone number) of the local 911 call center or PSAP. In this embodiment, emergency call switch 403 may not be necessary.

Figure 7:
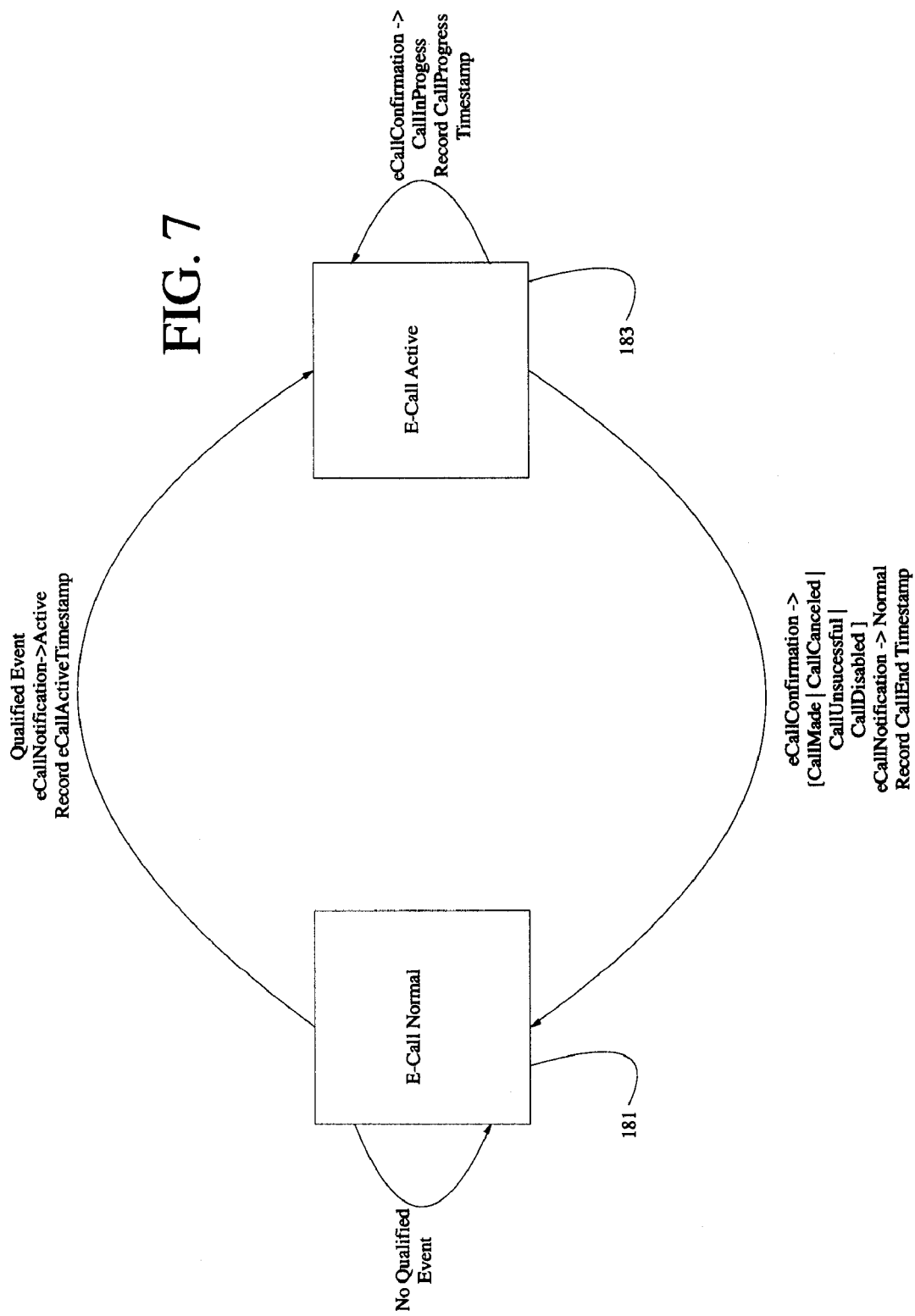
FIG. 7 is an exemplary state diagram of an RCM or equivalent device.

It may also be desirable to have the RCM record call requests for diagnostic purposes. FIG. 7 is an exemplary state diagram of an RCM or equivalent device. In this non-limiting example, the RCM transitions between a "normal" state 181 and a state where an eCall is requested (e.g., an "active" state) 183.

If the RCM is presently in a normal state, it remains there if a qualified event (e.g. airbag deployment) does not occur. Until a triggering event occurs, the RCM will remain in "normal" state.

If a qualified event occurs, the RCM may request an eCall, record a timestamp showing that an eCall was requested, and transition to an "active" state.

As long as a call in progress signal or the like is received by the RCM, it may remain in the active state. Once a confirmation comes that the call was, for example, completed, cancelled, etc., the RCM may record an end of call timestamp and transition back to a "normal" state. Additionally, for example, if messages are not received from the eCall transceiver, the RCM may log error messages so that diagnostics can determine there is a breakdown in communication.

Figure 8:
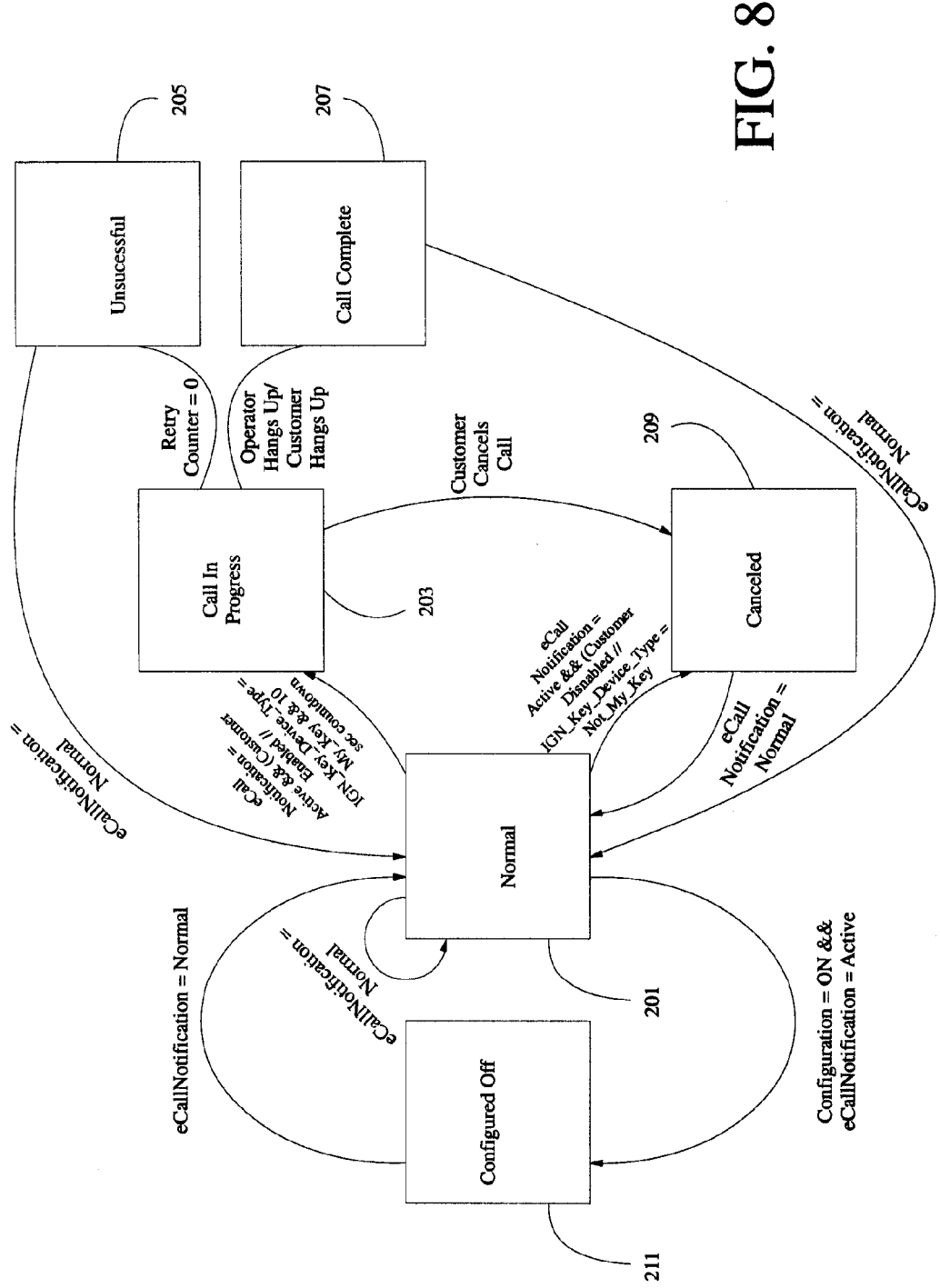
FIG. 8 is an exemplary state diagram of an eCall receiver or equivalent device.

FIG. 8 is an exemplary state diagram of an eCall transceiver or equivalent device. While no call is being placed, the eCall transceiver remains in a "normal" state 201. In this state, it notifies the RCM that it is not placing a call by sending a "normal" signal to the RCM. The receiver will remain in this state until a request from the RCM triggers a state change.

For example, if the RCM requests a call, the receiver may register as "active" and transition to a call in progress through a nomadic device. In addition, it may start a countdown timer before making the call, giving the user an opportunity to cancel the call. Once the timer is up, the receiver may have transitioned into a call in progress state 203.

Or, if eCall is disabled, even if the receiver registers as "active", it will be unable to place a call. In this case, it may transition to a canceled state 209. The canceled state may also be reached from the call in progress state if the caller cancels the call. Once the call is canceled, the receiver may notify the RCM that the call was canceled and return to a normal state.

If the call is in progress, the call may be ended because the nomadic device is unavailable. That is, although the receiver is attempting to place a call, there is no nomadic device that is free for data transfer. In this case, the receiver may transition to an unsuccessful state 205. The receiver may also retry the call for a definable number of times before reaching this state, in an attempt to find a working nomadic device, for example.

The call in progress can transition to a call timeout state if a DTFM, for example, is not received. A timeout signal can cause the call process to be repeated for a predefined number of times before determining call completed, not completed, connection not available, etc.

The call may also be completed when one party hangs up. If the receiver detects that the user or operator has ended the call, the receiver may transition to a call complete state 207. In both this state and the unsuccessful state, the receiver may notify the RCM that it has returned to a normal state, since the call is no longer being placed in either event.

Finally, in this non-limiting example, if the eCall receiver is turned off from an "on" state, the receiver may transition to an "off" state 211 to, for example, notify the user that eCall has been turned off. Once the notification is made, the receiver can return to its normal state, where it waits for further instructions.

While the illustrative embodiments may be provided in a vehicle where they are automatically activated, it may also be desirable to require some initialization before activating the system.

Figure 9:
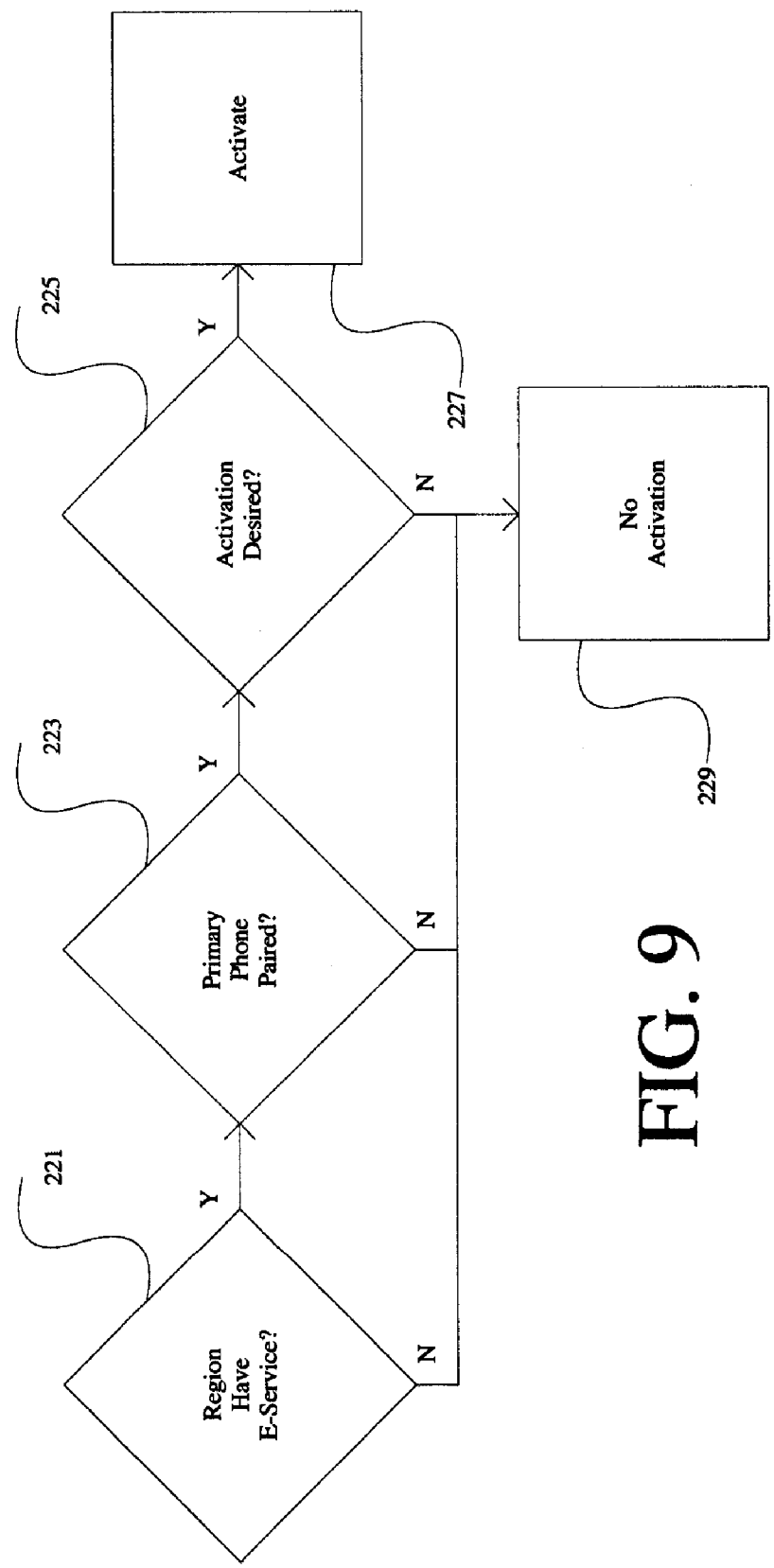
FIG. 9 shows an exemplary routine for activating an eCall system.

FIG. 9 shows an exemplary routine for activating an eCall system. First, there may be a vehicle regional code programmable at manufacture. This may indicate the region of the world in which the vehicle is intended to be deployed. This code may also be changeable by, for example, a dealer or other authorized agent.

The system checks the region code to see if emergency services are available in the deployed region 221. If not, the eCall system cannot be activated 227.

If the services are available, then, in this illustrative embodiment, the system checks to see if a primary phone is present in the vehicle 223. Typically, in a system with primary and secondary phones, the primary phone will belong to the owner of the vehicle. If the primary phone is present, the system proceeds with registration, otherwise it does not 227.

The system then asks the user if eCall activation is desired 225. If so, eCall is activated for the primary and all secondary phones 229, else it is not 227.

Figure 10:
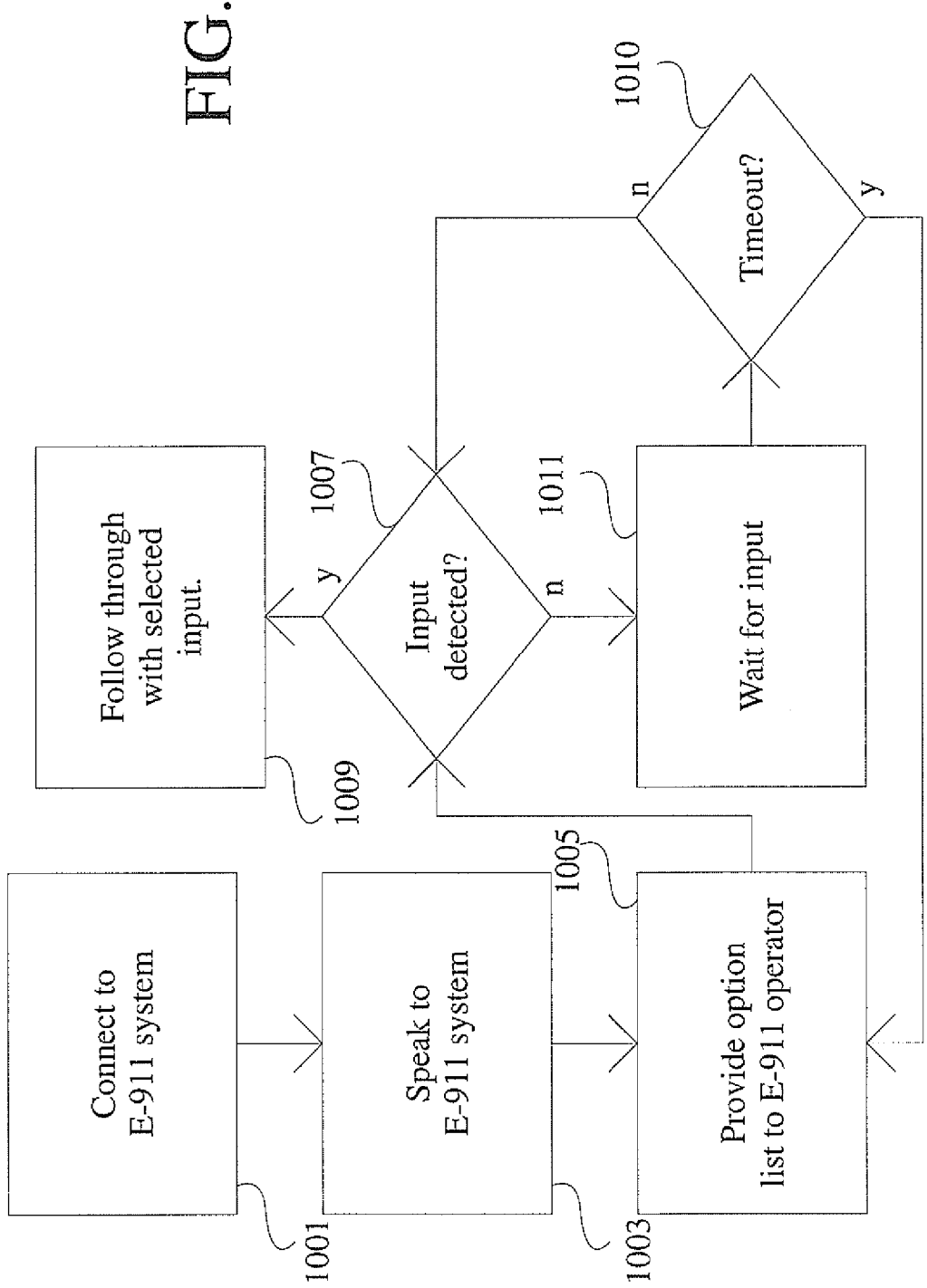
FIG. 10 shows an exemplary routine for processing an eCall including providing a plurality of options to an emergency operator.

In one illustrative embodiment, shown in FIG. 10, an exemplary, illustrative process for providing one or more information options to a 911 operator is shown. This process may be useful if there are varied sources of information available for an operator, for example. In another illustrative example, the operator may have the option to select an input type or format (e.g., without limitation, one of several foreign languages).

In this illustrative embodiment, the vehicle based computing system detects an emergency event as described herein, for example. The detection of an emergency event, or, for example, a command from a passenger, can cause the vehicle based computing system to connect to a 911 system 1001. The connection can be made via a call to 911, through a wireless networking connection, or through any other suitable method.

In this illustrative embodiment, once the vehicle based computing system has connected to the 911 system, the vehicle based computing system speaks to the 911 system 1003. This will typically cause the call to be passed forward to an operator, in systems where an operator does not immediately respond, and if an operator is already connected the vehicle based computing system can provide useful information.

Next, according to this illustrative embodiment, the vehicle based computing system provides a plurality of options to the 911 operator 1005. For example, the system can offer to provide the 911 operator with GPS coordinates of the vehicle. Or, the system can offer to transmit the coordinates as data directly to the 911 system.

Additionally, the vehicle based computing system can offer to provide vehicle safety system information. For example, if requested by the operator, the vehicle based computing system can transmit that airbags have been deployed, which airbags have been deployed, that a fuel cutoff switch has been triggered, etc. Other information, such as vehicle speed at impact, etc. can also be transferred to the 911 operator. This information may include an emergency algorithm result, the result indicating the likelihood of, for example, a severe injury.

In one illustrative embodiment, the operator responds to the system by pushing a number causing a specific DTMF tone to be played. For example, pressing "1" could cause the output, in data or in voice, of GPS coordinates from the vehicle based computing system. In another illustrative embodiment, the operator can speak the word "one" or make a general voice request for information, such as "GPS coordinates."

The GPS data or other data provided to the operator can be pulled by the vehicle based computing system from the CAN-BUS. In another illustrative embodiment, the vehicle based computing system can get GPS coordinates from a remote GPS device connected to the vehicle based computing system, such as a TOMTOM.

Once options have been provided to the 911 operator, the vehicle based computing system checks for input from the operator 1007. If input is not detected, the system can continue to check for input for a predetermined period of time 1011, checking if a timeout occurs 1010, and then repeat the menu options for the operator if a predetermined period of time has passed with no input.

Alternatively, if input is detected, the vehicle based computing system responds accordingly, providing the requested information to the operator 1009. The input received and recognized may be acknowledged verbally to both operator and occupant, i.e., "line open", "sending location", etc.

Figure 11:
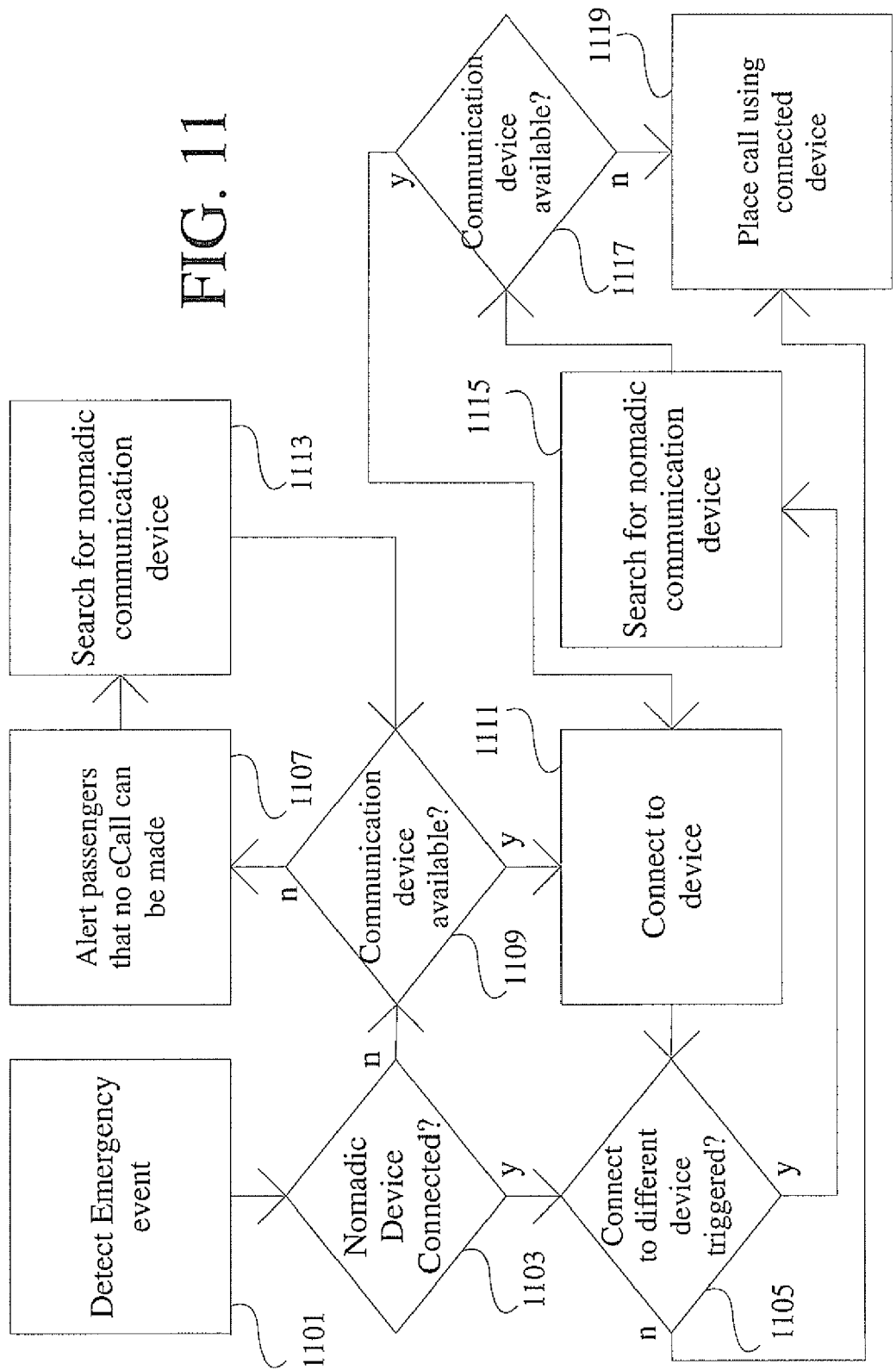
FIG. 11 shows an exemplary routine for selecting and connecting through a secondary input device in the event a primary input device is unavailable.

In another illustrative embodiment, it may be possible for the vehicle based computing system to place a call from through a secondary nomadic device if a primary nomadic device is disconnected or unavailable for any reason. An illustrative example of this process is shown in FIG. 11.

In this illustrative embodiment, the system may first detect an emergency event 1101. This could, for example, be any one of the scenarios described herein.

Once the event has been detected, the vehicle based computing system determines if a nomadic device is presently connected to the vehicle based computing system 1103.

If no device is connected, the system will attempt to detect and connect to any available device through which an eCall can be made. The system first checks to see if any communication devices are available 1109. If no device is available, the system may notify the passengers that a device is not available 1107. This notification may be useful in that it may allow a passenger to turn on a device, or inform the passenger that help needs to be obtained through an alternative source. Of course, the notification need not be present if desired.

Since the passenger may activate a communication device in response to the notification, or simply because a previously unavailable device may become available, the system continues to search for a communication device 1113.

Once a communication device is available, the system connects to the detected communication device 1111. In a "normal" operation mode, the processor may need permission from a user to connect to a communication device, although, in this embodiment, no permission is necessary since an emergency condition is present.

If the system is initially connected to a communication device, or if the system connects to a detected communication device, the system then checks to see if a "connect to new device" event has been triggered. This could be triggered for a plurality of reasons. For example, the connected device may not actually have an available cellular signal (meaning no actual call can be placed using that device). As another example, the connected device may be about to run out of power, meaning the call cannot be completed, even if it can be placed.

If there is a triggering event, the system searches for a different available communication device 1115. If such a device is available, the system connects 1111 and repeats the determination process. If no additional device is available 1117, then, as opposed to doing nothing in this example, the system attempts to place a call using the connected device 1119. This is the same action the system takes if the "connect to new device" event was not triggered.

In a further illustrative embodiment, the vehicle computing system, or a remote computing system, may provide advanced audio arbitration, and or user interaction.

For example, a vehicle navigation display may display the location of the vehicle, and a user may use this display to describe the location of the vehicle to a 911 operator. In addition, the direction of travel may be displayed. Since the vehicle may have been spun around in an accident, the direction of travel may be based on coordinates stored just prior to a detected accident. In another illustrative embodiment, the system may save a series of coordinates, and use the coordinates that, in the majority, designate a direction of travel. For example, if ten of twelve stored coordinates indicate a certain direction, then it is likely the vehicle was heading in that direction before the accident.

In this illustrative embodiment, the user may be stranded on, for example, a highway with no crossroads. Accordingly, it may be useful to display the direction that was being traveled for reporting to emergency services.

In yet a further embodiment, advanced arbitration may be employed at both ends of the call. For example, instead of playing only a vehicle based signal to an operator, the system could provide audio that is X % vehicle sound and Y % passenger audio. Thus, the operator is not prohibited from hearing the distress of an occupant while hearing the information from the vehicle.

Similarly, the vehicle occupant may hear the information being relayed to the operator, and may also be able to hear the operator speak. The signal is a mixed audio signal, allowing both sounds to be heard simultaneously. In addition, a button or command may be provided that allows an "open line", causing only the first or second signal to be heard.

Figure 12:
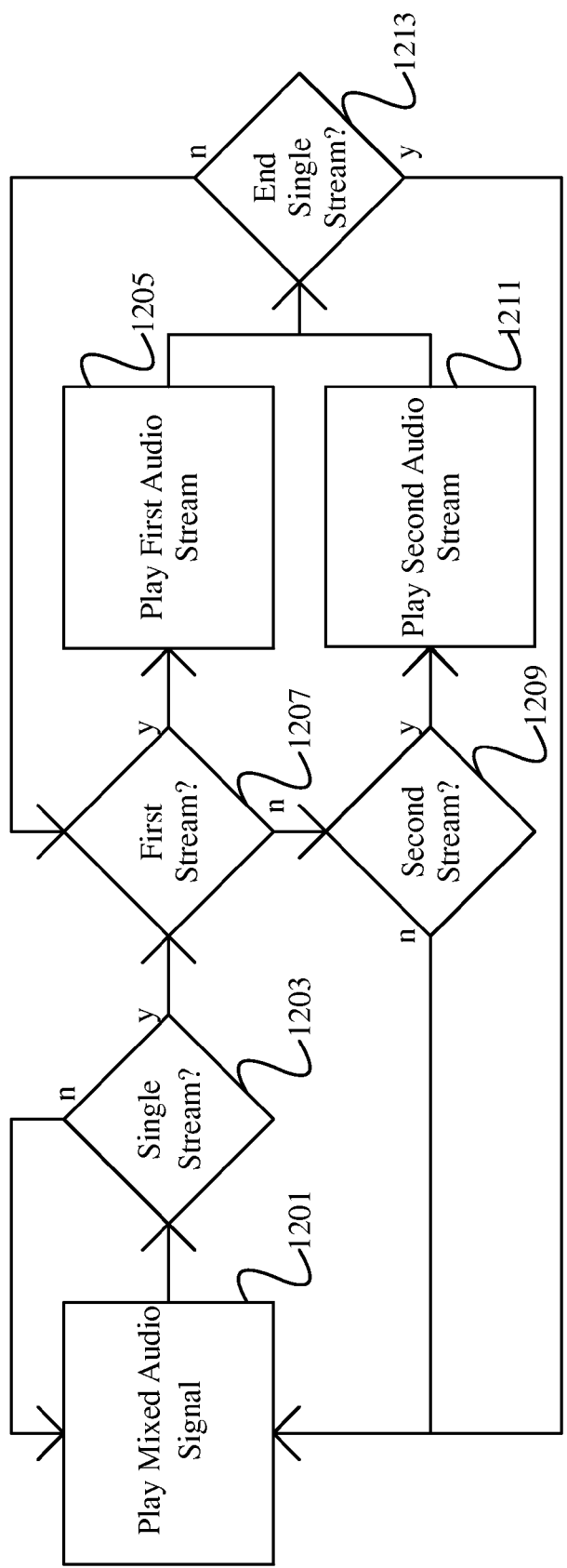
FIG. 12 shows an exemplary routine for arbitrating multiple audio streams.

An example of this illustrative embodiment is shown in FIG. 12. In this embodiment, the mixed signal is played at either end of the line 1201.

If either the occupant or an operator selects a first command to open a single audio stream exclusively 1203, and the first audio stream is selected 207, the first audio stream is played 1205. This stream is played exclusively until the button is pressed again to select the mixed stream 1213 (other options for ending the stream are also contemplated, such as completion of a message, silence on the stream, selecting an alternative command, etc).

If either the operator or the occupant selects a second command to open a second audio stream exclusively 1209, a second audio stream is played 1211. This stream is played exclusively until a command to cease the stream is provided 1213 (or other options as noted above).

Figure 13:
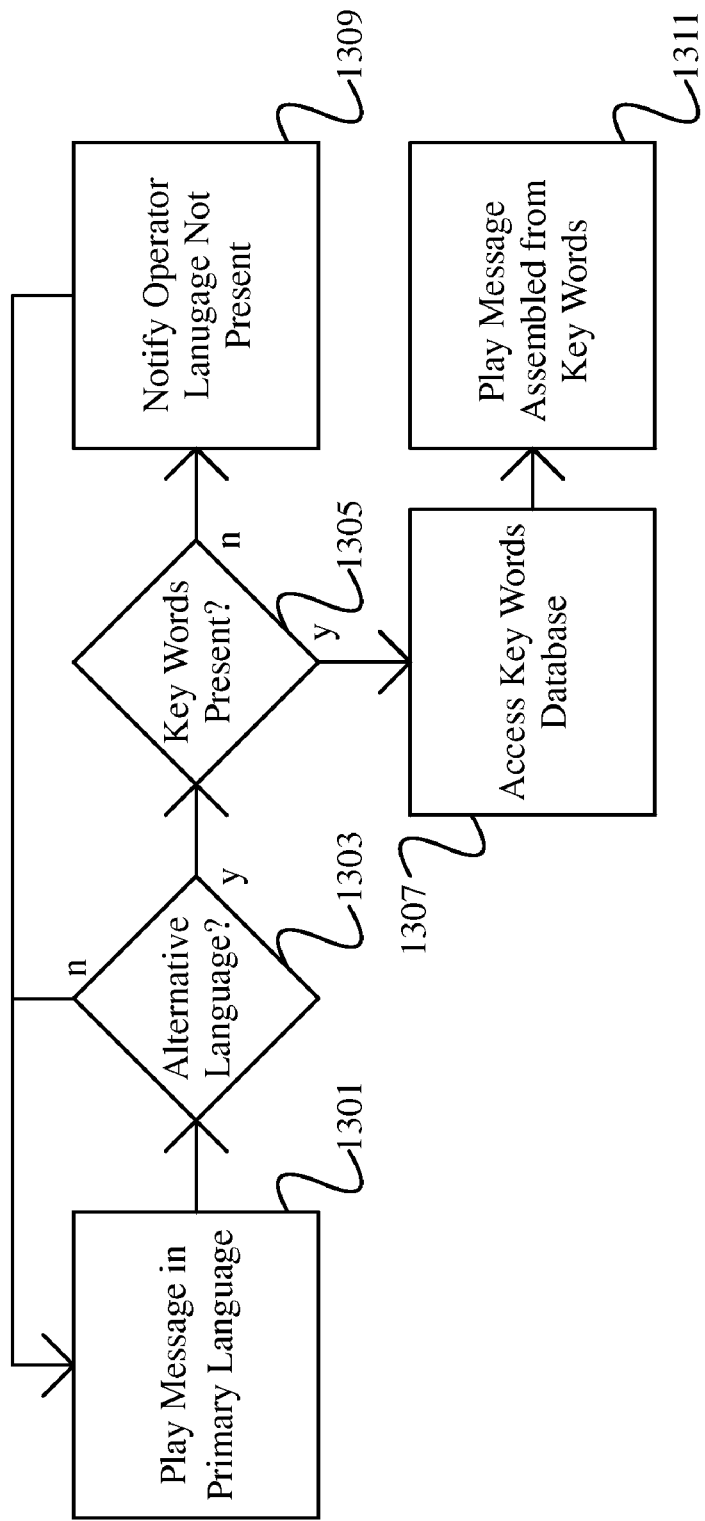
FIG. 13 shows an illustrative routine for playing a message assembled from key words.

In still a further illustrative embodiment, shown in FIG. 13, a vehicle computing system may provide information to an emergency instructor in a plurality of languages. In this illustrative embodiment, the vehicle computing system is operating in a first language set, and a set of key words is stored in one or more additional languages in a memory of the vehicle computing system.

First, the vehicle computing system plays a message to the emergency responder in the first language under which the system is operating 1301. Then, the vehicle computing system may receive an input for a second language 1303. If the second language request is received, the system checks to see if the requisite set of key words is present in the requested language 1305. If the words are not present, a message is presented to the emergency operator 1309.

If the set is present, the vehicle computing system accesses the stored words 1307 and plays back the appropriate words 1311.

In this illustrative embodiment, the played words are retrieved in a stored form, that is, key sentences are stored in advance in multiple languages and played back in recorded form. Emergency data includes, but is not limited to, changes in speed, impact speed, safety belt usage, airbag deployment, etc. Presumably, a finite number of words can be used to describe a variety of emergency conditions. Coordinates are also played back based on concatenations of stored individual numbers and the word "period" for example. As one example, 1303.22 may be played back "one" "three" "zero" "three" "point" "two" "two" and formed from the saved words "zero", "one", "two", "three", and "point". This may save time from having the system switch between two language sets, although such a solution is also possible.

Further, if the signal strength of the connection between the vehicle computing system and a nomadic device is low, or if the detected battery power is low, the vehicle computing system may "dump" critical information over an established connection without waiting for a prompt. This helps ensure that the important information is transferred before a connection is lost.

Alternatively, instead of waiting for a second language to be requested, the vehicle may automatically play the message in a second language. For example, if the vehicle computing system determines that the vehicle is in a geographical region where a language other than the selected language set is the local language, the system may automatically play back an emergency message in the local language after playing the message in the presently selected language set (the presently selected language set may be used, or the language of the region where the vehicle was sold may be used, although these two sets may be the same).

For example, without limitation, if a user passes from the United States to Mexico, the user may still have English as a selected language set. If the vehicle system were to switch to Spanish, the user may not understand the system. In this example, the system, recognizing that the user is in Mexico (based on, for example, GPS coordinates, codes in a cellular signal, etc.) would play an emergency message in Spanish after playing the message in English. Alternative, the Spanish message could be played first. Or, the system may load a secondary "Emergency Language Set" for limited use in generating emergency messages, while maintaining the English language set for communication with the occupants.

Figure 14:
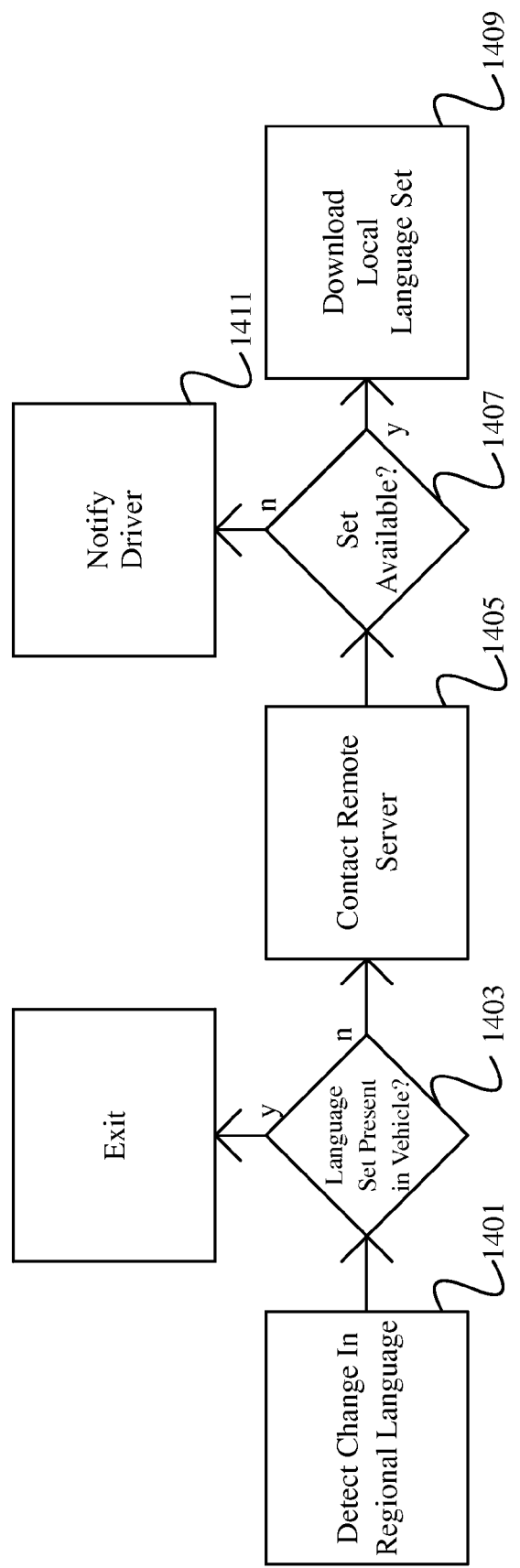
FIG. 14 shows an illustrative routine for automatically updating a language database.

In still another embodiment, shown in FIG. 14, a vehicle computing system dynamically updates a language set such that, if an emergency occurs, the appropriate language is ready for access.

If the vehicle computing system detects (or is informed) that a region using a different language than the selected language has been entered 1401, the system may then check for an appropriate set of key words for emergency situations 1403. If the words are not present, the system may contact a remote server 1405, to see if a set is available 1407. If no set is available, the driver may be notified that a local language set is not present 1411.

If the appropriate set is available, the system may download, over a remote connection, the set 1409. This allows the vehicle computing system to dynamically update with appropriate language sets. Provided an accident does not occur before the set is downloaded, the driver's experience will be as if the set had always been present.

In another illustrative embodiment, a touch screen vehicle display may include an SOS button. If the SOS button is pressed by a user, emergency services may be contacted. This may allow bypassing of the normal accident detection, auto-dialing system, or may be provided in addition to this system or in lieu of the system.

In yet a further illustrative embodiment, a roadside assist button may be included with a vehicle display. The button may be disabled during emergency calls, and may be activatable, via touch, to communicate with a roadside assistance computer/operator/provider.

A vehicle display may also provide a VIN number in the event of an emergency, and/or the VIN number may be provided to an emergency operator to aid in locating, for example, next of kin. The VIN may also be displayed on vehicle display.

A vehicle computing system and/or a phone may also be able to recognize if a busy signal occurs when an emergency number is dialed. In the event of a busy signal, the system may automatically redial a fixed number of times, indefinitely, or, for example, after dialing a fixed number of times, the system may call a secondary number, such as a stored emergency contact number. The system may also notify the occupants that a call was/was not completed.

Figure 15:
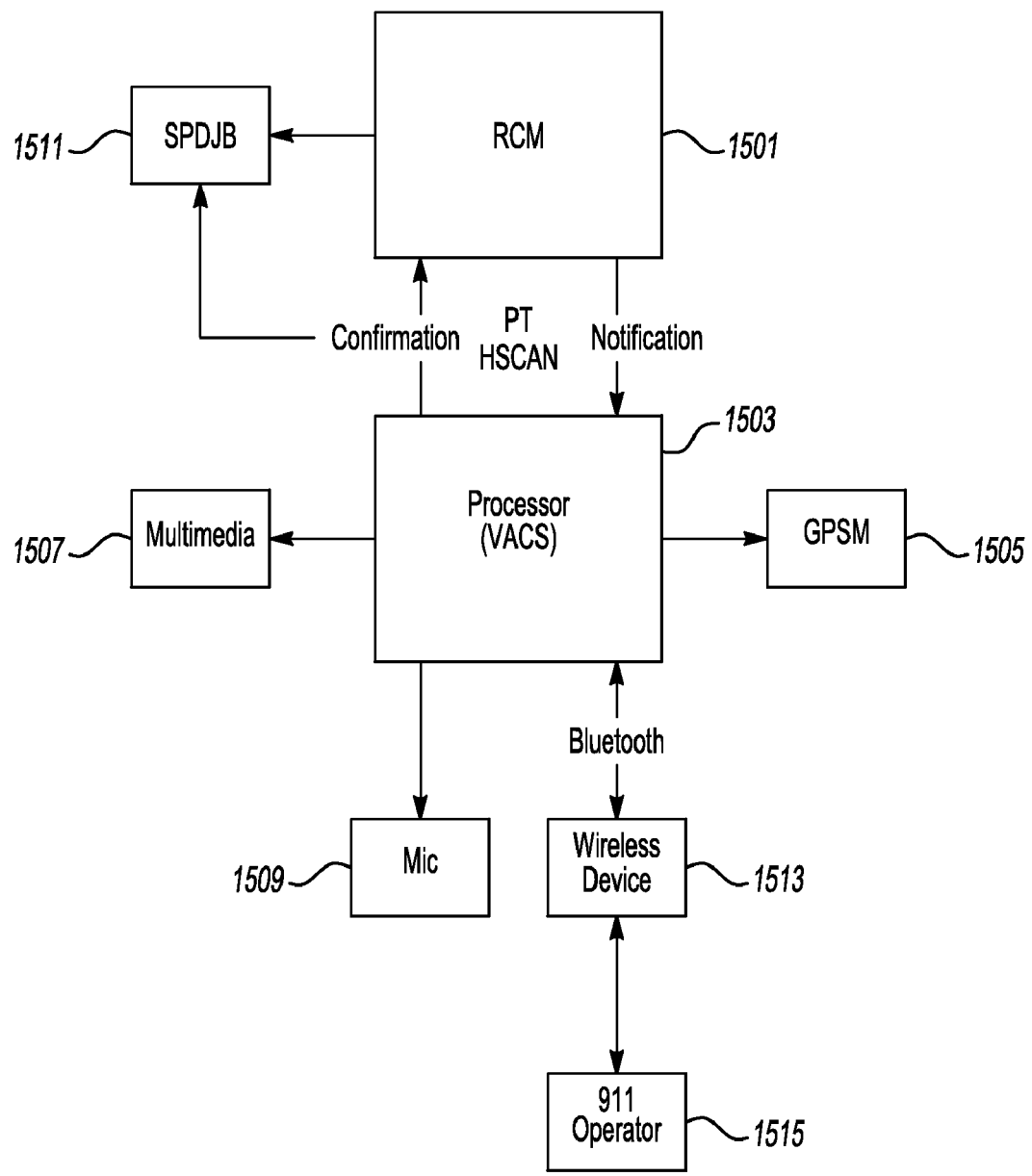
FIG. 15 shows an illustrative example of a vehicle associated computing system operable to place an emergency call.

FIG. 15 shows an illustrative example of a vehicle system operable to place an emergency call. In this illustrative example, a restraint control module (RCM) 1501 is instructed to send an emergency call notification to a vehicle associated computing system 1503 (VACS).

The VACS has several tasks that it may complete, in this illustrative embodiment. It may contact a global positioning system module (GPSM) 1505 to obtain vehicle coordinates.

The VACS may also access one or more multimedia outputs 1507. These outputs can be used to notify a user of the emergency call, output user interaction functions, etc.

The VACS may also send a confirmation, once a call is complete, back to the RCM, so that the RCM does not continue to try to instruct that an emergency call be placed.

Additionally, both the RCM and the VACS may be in communication with the SPDJB 1511.

The VACS may further be in communication with a microphone mounted in the vehicle (or provided on a wireless device) 1509. The microphone allows a vehicle occupant to communication with both the VACS and an emergency operator, if two-way communication with the vehicle is enabled.

Further, the VACS may instruct a wireless device, such as, but not limited to, a mobile phone 1513 in communication with the VACS, to place a call to a 911 operator 1515. Communication between both the operator and the mobile phone may flow in both directions, allowing messages to be sent to the 911 operator and allowing two-way communication between the 911 operator and a vehicle occupant.

This is just one illustrative, non-limiting example of a vehicle system capable of detecting an emergency condition and placing an emergency call. Other similar systems may also be used to provide the exemplary embodiments presented herein and other suitable embodiments within the scope of the invention.

Figure 16:
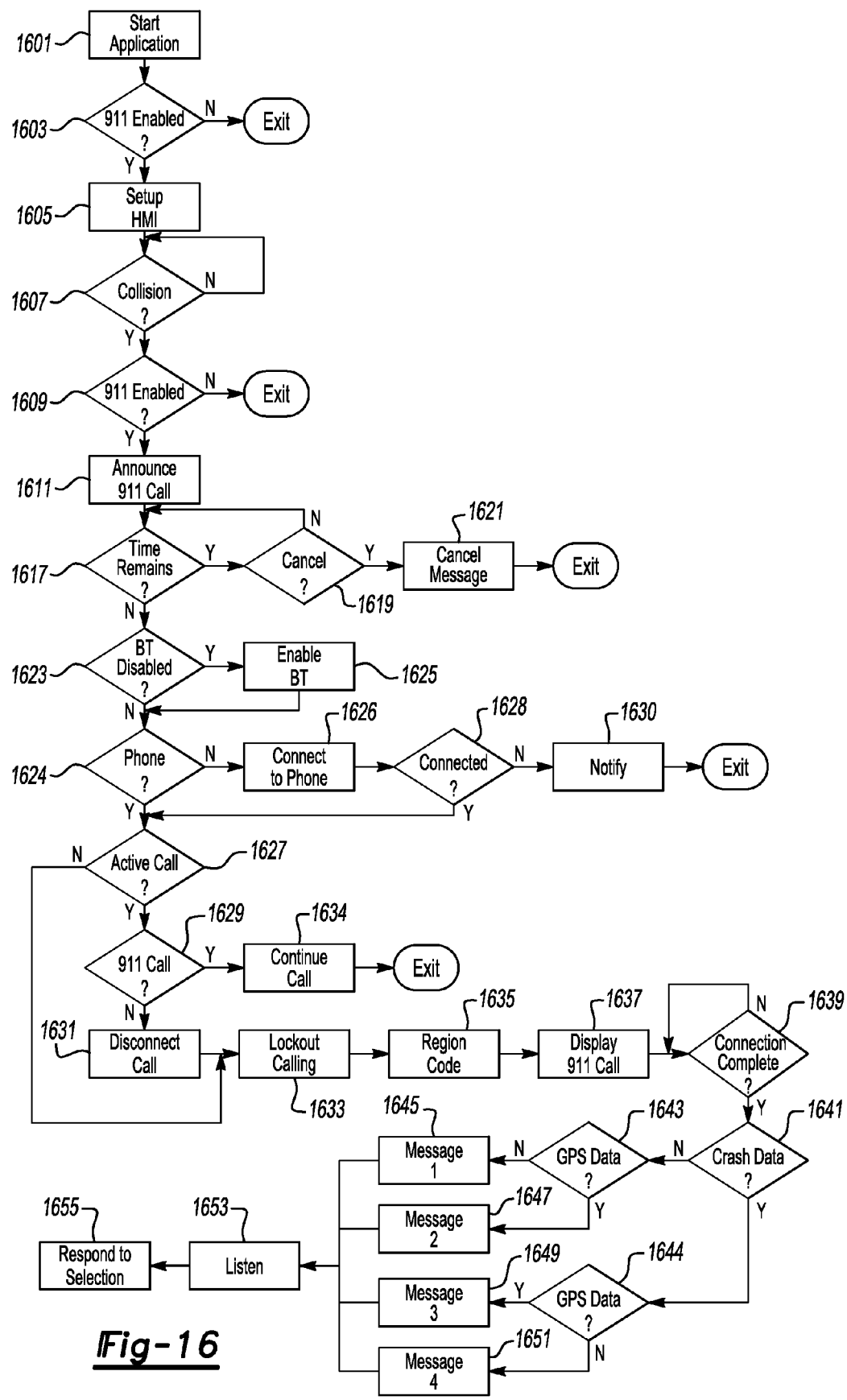
FIG. 16 shows an illustrative example of an emergency call placement process.

FIG. 16 shows an illustrative example of an emergency call placement process. In this illustrative example, an application runs in the background that monitors for emergency events.

The illustrative application begins running 1601, in response to, for example, a request from a vehicle computing system. This may be activated when the vehicle starts, when the vehicle begins moving, when a passenger presence is detected, etc.

Before the process begins monitoring for an emergency event 1607, the application checks to see if emergency calling is enabled 1603. If emergency calling is not enabled, the process may exit. In one illustrative example, the VACS may communicate with the RCM to notify the RCM whether or not emergency calling is enabled.

As long as emergency calling is enabled, the process sets up a human machine interface (HMI) 1605. This may include, but it not limited to, initializing an HMI, configuring an HMI based on available inputs/outputs, etc. Initialization of the HMI may include, but is not limited to, menu creation, shortcut creation, etc.

Once the HMI is initialized, the system begins monitoring for a collision 1607 (or other emergency event). Until an emergency event is detected, the system will continue monitoring (or until the vehicle is turned off or the application is otherwise disabled). In one illustrative embodiment, a request for an emergency call is transmitted from the RCM once an emergency event is detected.

If an emergency event is detected, the system again checks to see if emergency calling is enabled 1609. If emergency calling has been disabled, the system may exit (or notify an occupant and give an occupant an opportunity to enable emergency calling).

The process next announces to the vehicle occupant that a 911 call is being placed. This may give an opportunity for a vehicle occupant to cancel the 911 call, and will also let the occupant know that an emergency call is being placed.

In this illustrative process, the announcement that an emergency call is being placed begins a timer, providing an occupant with time to cancel the emergency call. For example, if the accident is a minor accident, and no emergency services are required, the occupant may elect to cancel the emergency call. As long as time remains 1617, the process will check to see if the emergency call has been cancelled by the occupant 1619. If the call is cancelled, the system may notify the occupant that the call was cancelled (in case, for example, the occupant unintentionally cancelled the call) 1621 and then the process may exit (or double check on the cancellation, etc.). The timer may be configurable by a user or by an OEM, and may also have a minimum value associated therewith.

Once the cancellation timer has expired, the system may check to see if BLUE TOOTH is enabled or disabled in the vehicle 1623. If BLUE TOOTH is disabled, the system may not be able to communicate with a wireless device through which a call is being placed, so BLUE TOOTH will be enabled 1625.

Once the process has ensured that BLUE TOOTH is enabled, the process checks to see if a wireless device, such as a wireless phone, is connected to the VACS 1624. If there is no device connected to the VACS, the process will attempt to connect to a wireless device 1626, such as a device that was previously paired with the VACS and is present within connection range. It is possible that multiple potential devices will be present within the vehicle, and so it is possible that this connection event will be repeated until a successful connection is established or until all options have been exhausted.

If a connection has been established 1628, the process will continue, but if no connection has been found, the system may notify an occupant 1630 and then exit.

If a wireless device was previously connected, or if a connection with a wireless device has been established, the process checks to see if a call is currently active on the connected wireless device 1627. It is possible that a user is using the wireless device to make a phone call at the time of the emergency event, and unless the call is already an emergency call, the process may require a free line to make an emergency call.

If the current call is an emergency call already 1629, the process will allow the call to continue and exit 1634. If there is a current call that is not an emergency call, the process will terminate the current call to free up the line for an emergency call 1631.

Once any non-emergency calls have been terminated, or if no calls are currently in progress that need to be terminated, the process may lock out outgoing calls (or at least outgoing calls placed through the VACS, if the process is unable to lock out the phone entirely) to prevent the user from using the phone while the system is attempting to place an emergency call. In another illustrative embodiment, the vehicle may lock out vehicle-controlled calls and if the user attempts to use the mobile phone while an emergency process is underway, the system may treat this as a cancellation of the emergency call.

Additionally, the process may check for a region code 1335. In some areas, different emergency numbers are used in different regions. If a current GPS location corresponds to a region for which an emergency number is known, the system will use that emergency number. If no region code is available, or if no GPS coordinates are available, the system may simply resort to using a base emergency number.

Once an emergency number has been set (if desired), the process notifies a user that an emergency call is now in progress 1637. A number of retry attempts may be made if the call is not completed on an initial attempt.

In one illustrative example, a system will output a message such as "connecting" while the call is in progress, and will then output a message such as "connected" when the connection has been established 1639.

Once the connection has been established, the VACS may desire to transmit a variety of information to an emergency operator, this information may include, but is not limited to, GPS information, crash information, vehicle sensor information, etc.

If crash data 1641 and GPS data 1643 are both unavailable, the system may output a first message 1645. Since neither crash nor GPS data are available in this case, the message may simply notify an emergency operator of a crash and provide an option to communicate with a vehicle occupant.

If crash data is unavailable but GPS data is available, the system may output a second message 1647. In this case, an option to hear a vehicle location may also be provided, or the vehicle location may automatically be provided.

If crash data is available and GPS data is available, the system may play a third message 1649. In this instance, the system may provide the operator with an option to hear crash information, to hear GPS information, and may also notify the operator of the crash. Additionally or alternatively, the system may automatically play one or more of the vehicle crash information and/or the GPS information.

If crash data is available and GPS data is unavailable, a fourth message may be played 1651. This message may provide the operator with an option to hear crash information and/or automatically play crash information.

Once any initial messages to the emergency operator are complete, the process may open a direct communication line with the vehicle occupant. In this illustrative embodiment, once communication is open, the process listens for operator numeric selection input 1653 and responds to the input 1655 as needed.

Emergency messages and GPS coordinates may be played in a variety of languages, and repeated a multiple number of times, depending on desired settings. For example, in North America, if the emergency occurs in Canada, the system may play the message in both French and English. Additionally, the message may be repeated a plurality of times in each of the applicable languages.

In at least one illustrative example, crash data may be assembled from a concatenation table of crash related phrases. One non-limiting example of such a table is shown below. Depending on the particular incident, phrases from the table may be concatenated to provide crash information.

| | |
|---|---|
| 1 | frontal impact |
| | side impact |
| | angular impact |
| | rear impact |
| 2 | with rollover |
| | Or blank |
| 3 | Multiple impacts detected. (pause) |
| | Or blank |
| 4 | Maximum Delta V at impact |
| 5 | Miles per Hour (pause) |
| | Kilometers per Hour (pause) |
| 6 | Driver (if 7 or 9 exist) |
| | No Airbags deployed. (pause) (if 7, 9, 12, 14 = null) |
| | Or blank |
| 7 | front |
| | Or blank |
| 8 | and (if 9 exists) |
| | Or blank |
| 9 | Side |
| | Or blank |
| 10 | (pause) and (if 7 or 9 -and- 12 or 14 exists) |
| | Or blank |
| 11 | passenger (if 12 or 14 exists) |
| | Or blank |
| 12 | front |
| | Or blank |
| 13 | and (if 13 exists) |
| | Or blank |
| 14 | side |
| | Or blank |
| 15 | airbags (if multiple 7, 9, 12, 14) |
| | airbag (if only singular event from 7, 9, 12, 14) |
| | Or blank |
| 16 | Deployed. (pause) - (if 7, 9, 12, 14 exist) |
| | Or blank |
| 17 | Driver |
| | Or blank |
| 18 | and (if 19 exists) |
| | Or blank |
| 19 | front passenger |
| | Or blank |
| 20 | seat belts fastened at crash. (pause) (if 17 and 19 exist) |
| | seat belt fastened at crash. (pause) (if 17 or 19 exist) |
| | Front seat belts unbuckled at crash. (pause) |
| 21 | Potential of child in front passenger seat (pause). |
| | Or blank |
| 22 | Rear seat belt status unknown (pause) |
| | A minimum of (x) rear seatbelts fastened. (pause) |

For example, a message could be delivered as follows, using concatenations from the above table:

A side impact[1] crash with rollover[2] has occurred. (pause) Multiple impacts detected. (pause)[3] The maximum speed change detected was 18[4] miles per hour. (pause)[5] Driver[6] front[7] and[8] side[9] (pause) and[10] passenger[11] front[12] and[13] side[14] airbags[15] deployed. (pause)[16] Driver[17] and[18] front passenger[19] seat belts fastened at crash (pause)[20] Potential of child in front passenger seat (pause).[21] Rear seat belt status unknown.[22]

In this example, each superscript refers to the portion of the table from which the information was obtained and added to the sentence to complete the message.

Figure 17:
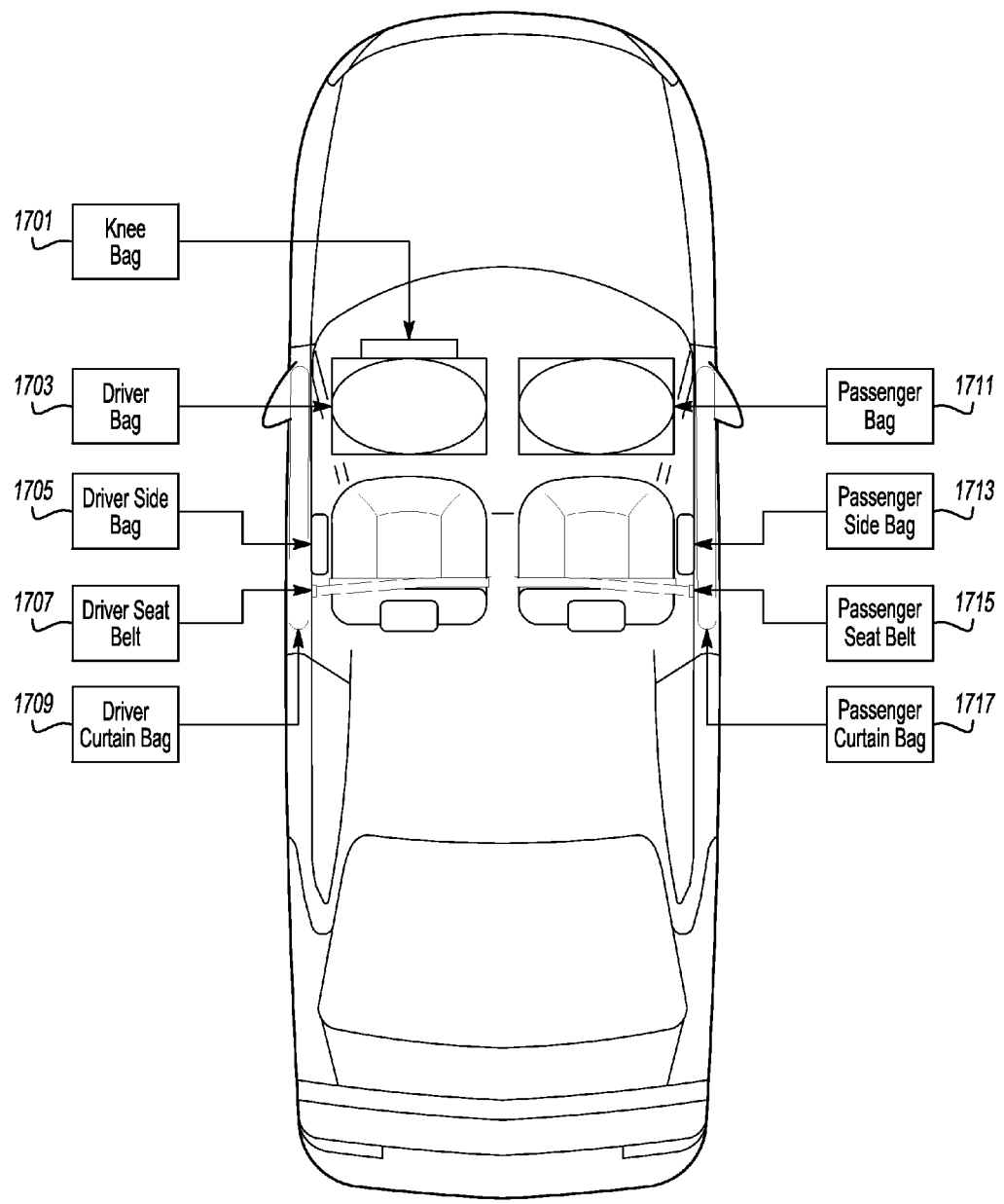
FIG. 17 shows an illustrative example of a plurality of vehicle emergency devices.

FIG. 17 shows an illustrative example of a plurality of vehicle emergency devices. This non-limiting set of examples provides some instances of particular safety features that may be deployed in the event of an accident.

Each of the exemplary safety devices may have various states associated therewith. In the event an accident is detected and an emergency operator needs crash information, the relevant states of safety devices may be queried and transmitted.

What follows is a set of non-limiting examples of safety devices and non-limiting examples of their possible states.

An impact event maximum lateral delta may have several states associated therewith. In one non-limiting example, these states are: No event; a range of lateral delta; a not-supported signal; and a faulty signal.

A crash event type may have several states associated therewith. In one non-limiting example, these states are: no event; frontal impact; side impact; rear impact; rollover; not-supported; and faulty.

A driver side airbag 1703, may have several states associated therewith. In one non-limiting example, these states are: no event; deployed; not deployed; not-supported and faulty.

A passenger side airbag 1711, may have several states associated therewith. In one non-limiting example, these states are: no event; deployed; not deployed; not-supported and faulty.

A driver side side-airbag 1705, may have several states associated therewith. In one non-limiting example, these states are: no event; deployed; not deployed; not-supported and faulty.

A passenger side side-airbag 1713, may have several states associated therewith. In one non-limiting example, these states are: no event; deployed; not deployed; not-supported and faulty.

A driver side curtain-airbag 1709, may have several states associated therewith. In one non-limiting example, these states are: no event; deployed; not deployed; not-supported and faulty.

A passenger side curtain-airbag 1717, may have several states associated therewith. In one non-limiting example, these states are: no event; deployed; not deployed; not-supported and faulty.

A driver side knee-airbag 1701, may have several states associated therewith. In one non-limiting example, these states are: no event; deployed; not deployed; not-supported and faulty.

A driver side seat belt 1707 may have several states associated therewith. In one non-limiting example, these states are: no event; belted, not belted; not supported, faulty. The seat belt may also have deployed and not deployed statuses associated therewith to determine if retractor pretensioners are used or a load limiter status.

A passenger side seat belt 1715 may have several states associated therewith. In one non-limiting example, these states are: no event; belted, not belted; not supported, faulty. The seat belt may also have deployed and not deployed statuses associated therewith to determine if retractor pretensioners are used or to determine a load limiter status.

A front passenger classification may also be present to determine whether or not a child is present in the front seat of the vehicle. In one non-limiting example, these states are: no event; child detected; child not detected; not supported; and faulty.

Seat belt classifications may also have states associated therewith for rear, middle and third row seats, for each seat having a seat belt corresponding thereto. In one non-limiting example, these states are: no event; belted; not belted; unsupported; and faulty.

While various exemplary, illustrative, non-limiting embodiments have been described in detail, those familiar with the art to which this invention relates will recognize various alternative designs and embodiments for practicing the invention, which is only limited by the following claims.

What is claimed:

1. A method, implemented by a vehicle associated computing system (VACS), comprising:
   monitoring for an emergency event;
   if an emergency event is detected, indicating an attempt to dial an emergency number;
   determining if a wireless connection is enabled;
   if a wireless connection is not enabled, enabling the wireless connection;
   determining if a wireless device is connected to the VACS;
   if the wireless device is not connected to the VACS, connecting to the wireless device;
   determining if a call is currently in progress on the wireless device;
   determining if the call currently in progress is an emergency call;
   if a call is currently in progress on the wireless device, canceling the call in progress, unless the call in progress is a second emergency call, in which case the canceling is skipped and the call is allowed to continue without interference; and
   placing an emergency call through the wireless device to an emergency operator, wherein placement of the call enables direct communication between a vehicle occupant and an emergency operator.

2. The method of claim 1, wherein the wireless connection is a BLUE TOOTH connection.

3. The method of claim 1, further comprising locking out an ability to place calls, other than the emergency call, through the VACS for the duration of the emergency call.

4. The method of claim 1, further comprising:
   determining a region in which the vehicle is present, based at least in part on GPS coordinates; and
      determining a language corresponding to the region in which the vehicle is present; and
      using at least the determined language to speak a message to the emergency operator upon connection to the emergency operator.

5. The method of claim 1, further comprising:
   determining if crash data is available; and
   providing the emergency operator with an option to retrieve crash data, if crash data is available.

6. The method of claim 1, further comprising:
   determining if GPS data is available; and
   providing the emergency operator with an option to retrieve GPS data, if GPS data is available.

7. A non-transitory computer readable storage medium, storing instructions that, when implemented by a vehicle associated computing system (VACS), cause the VACS to perform the method comprising:

monitoring for an emergency event;
if an emergency event is detected, indicating an attempt to dial an emergency number;
determining if a wireless connection is enabled;
if a wireless connection is not enabled, enabling the wireless connection;
determining if a wireless device is connected to the VACS;
if the wireless device is not connected to the VACS, connecting to the wireless device;
determining if a call is currently in progress on the wireless device;
determining if the call currently in progress is an emergency call;
if the call is currently in progress on the wireless device, canceling the call in progress, unless the call in progress is an emergency call, in which case the canceling is skipped and the call is allowed to continue without interference; and
placing an emergency call through the wireless device to an emergency operator, wherein placement of the call enables direct communication between a vehicle occupant and an emergency operator.

8. The computer readable storage medium of claim 7, wherein the wireless connection is a BLUE TOOTH connection.

9. The computer readable storage medium of claim 7, wherein the method further comprises locking out an ability to place calls, other than the emergency call, through the VACS for the duration of the emergency call.

10. The computer readable storage medium of claim 7, wherein the method further comprises:

determining a region in which the vehicle is present, based at least in part on GPS coordinates; and
determining a language corresponding to the region in which the vehicle is present; and
using at least the determined language to speak a message to the emergency operator upon connection to the emergency operator.

11. The computer readable storage medium of claim 7, wherein the method further comprises:

determining if crash data is available; and
providing the emergency operator with an option to retrieve crash data, if crash data is available.

12. The computer readable storage medium of claim 7, wherein the method further comprises:

determining if GPS data is available; and
providing the emergency operator with an option to retrieve GPS data, if GPS data is available.

13. A system comprising a processor configured to:

determine a call is in progress on a wirelessly connected cellular phone, cancel the call in progress; and
place an emergency call through the cellular phone enabling direct communication between a vehicle occupant and an emergency operator, wherein the processor is configured to determine if the call in progress is a second emergency call, and if so skip cancellation and allow the call to continue without interference.

14. The system of claim 13, wherein the wireless communication is over a BLUE TOOTH connection.

15. The system of claim 13, wherein the processor is further configured to lock out an ability to place calls, other than the emergency call, through a vehicle computing system for the duration of the emergency call.

16. The system of claim 13, wherein the processor is further configured to determine a region in which a vehicle is present, based at least in part on GPS coordinates; and determine a language corresponding to the region in which the vehicle is present; and use at least the determined language to speak a message to the emergency operator upon connection to the emergency operator.

* * * * *